US012802701B2

(12) United States Patent
Karp et al.

(10) Patent No.: US 12,802,701 B2
(45) Date of Patent: Nov. 17, 2026

(54) ECHO CANCELLATION (EC) OF 2 AUDIO SOURCES

(71) Applicant: Sony Interactive Entertainment Inc., Tokyo (JP)

(72) Inventors: Sarah Karp, San Mateo, CA (US); Samuel Benjamin Schaevitz, San Mateo, CA (US); Kyungsoo Kim, San Mateo, CA (US); Alexander J. Brown, San Mateo, CA (US)

(73) Assignee: Sony Interactive Entertainment Inc., Tokyo (JP)

( * ) Notice: Subject to any disclaimer, the term of this patent is extended or adjusted under 35 U.S.C. 154(b) by 77 days.

(21) Appl. No.: 18/930,917

(22) Filed: Oct. 29, 2024

(65) Prior Publication Data

US 2026/0120704 A1 Apr. 30, 2026

(51) Int. Cl.

| | |
|---|---|
| ***G10L 21/0216*** | (2013.01) |
| ***H04R 3/00*** | (2006.01) |
| ***H04R 3/14*** | (2006.01) |
| ***H04R 5/02*** | (2006.01) |
| ***H04R 5/027*** | (2006.01) |
| ***H04R 5/04*** | (2006.01) |
| ***H04S 1/00*** | (2006.01) |
| ***H04S 7/00*** | (2006.01) |
| *G10L 21/0208* | (2013.01) |

(52) U.S. Cl.

CPC .......... *G10L 21/0216* (2013.01); *H04R 3/005* (2013.01); *H04R 3/14* (2013.01); *H04R 5/02* (2013.01); *H04R 5/027* (2013.01); *H04R 5/04* (2013.01); *H04S 1/007* (2013.01); *H04S 7/307* (2013.01); *G10L 2021/02082* (2013.01); *G10L 2021/02166* (2013.01); *H04R 2420/07* (2013.01); *H04S 2420/07* (2013.01)

(58) Field of Classification Search

CPC ....... G10L 21/0216; G10L 2021/02082; G10L 2021/02166; H04R 3/005; H04R 3/14; H04R 5/02; H04R 5/027; H04R 5/04; H04R 3/12; H04R 2420/07; H04S 1/007; H04S 7/307

USPC .......................... 381/71.1, 122, 309, 12, 303

See application file for complete search history.

(56) References Cited

U.S. PATENT DOCUMENTS

| | | | | |
|---|---|---|---|---|
| 7,647,077 | B2 | 1/2010 | Hui et al. | |
| 9,408,018 | B2 | 8/2016 | Quian | |
| 9,412,354 | B1 * | 8/2016 | Ramprashad | .......... H04R 3/005 |

(Continued)

FOREIGN PATENT DOCUMENTS

| | | |
|---|---|---|
| WO | WO 2010068351 A1 | 6/2010 |
| WO | WO 2022195286 A1 | 9/2022 |

OTHER PUBLICATIONS

International Search Report and Written Opinion in International Appln. No. PCT/US2025/041018, mailed on Sep. 9, 2025, 9 pages.

*Primary Examiner* — Norman Yu

(74) *Attorney, Agent, or Firm* — Fish & Richardson P.C.

(57) ABSTRACT

Technique are described for wirelessly receiving, at first and second speaker assemblies, signals representing left and right audio channels from each of first and second sources, and using the signals, simultaneously playing, on both speaker assemblies, music, computer game audio, computer chat audio, and speech picked up by speaker microphones. Echo cancelation may be performed using local and remote channels to isolate microphone signals.

20 Claims, 24 Drawing Sheets

(56) References Cited

U.S. PATENT DOCUMENTS

| | | | |
|---|---|---|---|
| 9,900,692 | B2 | 2/2018 | McCoy |
| 9,918,163 | B1 | 3/2018 | Ayrapetian et al. |
| 10,292,000 | B1 | 5/2019 | Milne et al. |
| 11,159,887 | B2 | 10/2021 | Dusse et al. |
| 12,035,116 | B2 | 7/2024 | Park et al. |
| 2002/0090094 | A1 | 7/2002 | Amir et al. |
| 2003/0022546 | A1 | 1/2003 | Solomich et al. |
| 2006/0008094 | A1 * | 1/2006 | Huang .................... H04S 3/008 381/2 |
| 2006/0277571 | A1 | 12/2006 | Marks et al. |
| 2008/0292121 | A1 | 11/2008 | Yokota |
| 2009/0175456 | A1 | 7/2009 | Johnson |
| 2009/0298420 | A1 | 12/2009 | Haartsen et al. |
| 2010/0166237 | A1 | 7/2010 | Leeper |
| 2011/0144779 | A1 | 6/2011 | Janse et al. |
| 2011/0286615 | A1 | 11/2011 | Olodort et al. |
| 2012/0185769 | A1 | 7/2012 | Whitley |
| 2013/0041648 | A1 | 2/2013 | Osman |
| 2013/0329893 | A1 | 12/2013 | Lee et al. |
| 2014/0355752 | A1 | 12/2014 | Sorensen et al. |
| 2016/0073188 | A1 | 3/2016 | Linden et al. |
| 2016/0174011 | A1 | 6/2016 | Rider et al. |
| 2016/0219367 | A1 | 7/2016 | Florczak et al. |
| 2018/0020305 | A1 | 1/2018 | Hardek |
| 2018/0190306 | A1 | 7/2018 | Hetherington et al. |
| 2018/0206029 | A1 | 7/2018 | Colich |
| 2018/0255398 | A1 | 9/2018 | Fischer et al. |
| 2018/0295432 | A1 | 10/2018 | Humphreys |
| 2019/0096384 | A1 | 3/2019 | Sereshki et al. |
| 2019/0124193 | A1 | 4/2019 | Kim et al. |
| 2019/0182583 | A1 | 6/2019 | Englert |
| 2020/0021909 | A1 | 1/2020 | Smithers et al. |
| 2020/0084537 | A1 | 3/2020 | Milne et al. |
| 2020/0103486 | A1 | 4/2020 | Knaappila |
| 2020/0219493 | A1 * | 7/2020 | Li ............................ G10L 15/22 |
| 2020/0288246 | A1 | 9/2020 | Polleros et al. |
| 2020/0396559 | A1 | 12/2020 | Crockett et al. |
| 2022/0086557 | A1 | 3/2022 | Bonanno |
| 2022/0132221 | A1 | 4/2022 | Shimy et al. |
| 2022/0329959 | A1 | 10/2022 | Pham et al. |
| 2022/0337969 | A1 | 10/2022 | Seefeldt et al. |
| 2022/0355193 | A1 | 11/2022 | Kuruba Buchannagari et al. |
| 2023/0022546 | A1 | 1/2023 | Malchano et al. |
| 2023/0066209 | A1 | 3/2023 | Greff et al. |
| 2024/0135948 | A1 | 4/2024 | Betts et al. |
| 2026/0120703 | A1 | 4/2026 | Karp et al. |
| 2026/0121429 | A1 | 4/2026 | Karp et al. |
| 2026/0122387 | A1 | 4/2026 | Karp et al. |
| 2026/0122408 | A1 | 4/2026 | Karp et al. |
| 2026/0122419 | A1 | 4/2026 | Karp et al. |
| 2026/0122420 | A1 | 4/2026 | Karp et al. |
| 2026/0122438 | A1 | 4/2026 | Karp et al. |
| 2026/0122442 | A1 | 4/2026 | Karp et al. |

* cited by examiner

ECHO CANCELLATION (EC) OF 2 AUDIO SOURCES

FIELD

The present application relates generally to wireless speakers and more particularly to wireless speakers that can play audio from two or more wireless sources.

BACKGROUND

Computer gamers play video games using various displays and speakers communicating with a game console and/or game server. As understood herein, gamers may not want to wear a headset during play but nonetheless might want to move around the space they are in during play, repositioning speakers accordingly.

SUMMARY

As further envisioned herein, gamers may wish to use stereo speakers to listen to music, game audio, chat audio, and talk to friends at same time.

An apparatus includes at least a first audio speaker that includes at least first and second wireless radios configured to receive signals representing stereo audio from first and second sources. Circuitry in the first audio speaker is configured to process first and second channels of each stereo audio from the first and second sources at least in part by mixing the first and second channels of each stereo audio from the first and second sources into a local channel and a remote channel, splitting the local channel into a high band and a low band, and playing the high band on a tweeter of the first audio speaker and playing the low band on a woofer of the first audio speaker. The circuitry is configured to send isolated voice signals from at least one microphone on the first speaker back through the first and second wireless radios to the first and second sources.

In some examples, the circuitry is implemented in hardware. In other examples, the circuitry is implemented in software. In still other examples the circuitry is implemented in hardware and software.

In an example embodiment the first wireless radio uses a first communication protocol and the second wireless radio uses a second communication protocol. If desired, the first source may include a computer game console and the second source may include a wireless phone or tablet computer.

In example implementations, the circuitry can be configured to implement user-adjusted EQ on the remote and local channels. The circuitry further may be configured to implement non-user-adjusted EQ on the remote and local channels. Still further, example circuitry may be configured to implement user-adjusted EQ on the high band and the low band of the local channel and to implement user-adjusted EQ on the isolated voice signals.

In non-limiting implementations the circuitry can be configured to use the local channel and remote channel to isolate signals from the at least one microphone on the first speaker to produce the isolated voice signals by executing stereo echo cancelation on the signals from the at least one microphone.

Example embodiments may include circuitry that is configured to implement beamforming on signals from plural microphones before implementing stereo echo cancelation on signals from the microphones.

In an example, the circuitry can be configured to implement noise cancelation on the isolated voice signals, e.g., using machine learning.

In another aspect, a method includes wirelessly receiving, at first and second speaker assemblies, signals representing left and right audio channels from each of first and second sources, and using the signals, simultaneously playing, on both speaker assemblies, at least three of: music, computer game audio, computer chat audio, and speech picked up by at least one speaker microphone. The method includes isolating microphone-generated signals in the signals and executing echo cancelation on the microphone-generated signals.

In another aspect, an apparatus includes at least a first speaker configured to receive wireless signals from first and second sources, the wireless signals from each source representing stereo audio. Circuitry in the speaker is configured to mix the stereo audio from the first and second sources into local and remote channels, and split the local channel into high and low bands. The circuitry is configured to play the high and low bands respectively on a tweeter and a woofer of the first speaker. Also, the circuitry is configured to isolate signals from at least one microphone on the first speaker to produce isolated voice signals by executing stereo echo cancelation on the signals from the at least one microphone.

The details of the present application, both as to its structure and operation, can be best understood in reference to the accompanying drawings, in which like reference numerals refer to like parts, and in which:

DETAILED DESCRIPTION

Figure 1:
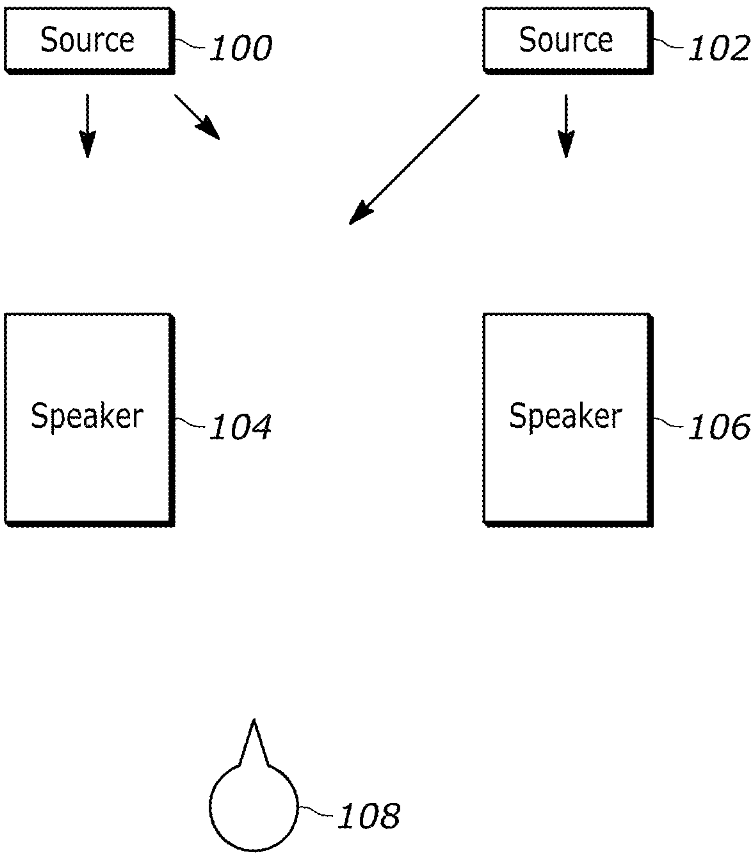
FIG. 1 is a simplified block diagram of a portable stereo speaker system consistent with present principles.

This disclosure relates generally to computer ecosystems including aspects of consumer electronics (CE) device networks such as but not limited to computer game networks. A system herein may include server and client components which may be connected over a network such that data may be exchanged between the client and server components. The client components may include one or more computing devices including game consoles such as Sony PlayStation® or a game console made by Microsoft or Nintendo or other manufacturer, extended reality (XR) headsets such as virtual reality (VR) headsets, augmented reality (AR) headsets, portable televisions (e.g., smart TVs, Internet-enabled TVs), portable computers such as laptops and tablet computers, and other mobile devices including smart phones and additional examples discussed below. These client devices may operate with a variety of operating environments. For example, some of the client computers may employ, as examples, Linux operating systems, operating systems from Microsoft, or a Unix operating system, or operating systems produced by Apple, Inc., or Google, or a Berkeley Software Distribution or Berkeley Standard Distribution (BSD) OS including descendants of BSD. These operating environments may be used to execute one or more browsing programs, such as a browser made by Microsoft or Google or Mozilla or other browser program that can access websites hosted by the Internet servers discussed below. Also, an operating environment according to present principles may be used to execute one or more computer game programs.

Servers and/or gateways may be used that may include one or more processors executing instructions that configure the servers to receive and transmit data over a network such as the Internet. Or a client and server can be connected over a local intranet or a virtual private network. A server or controller may be instantiated by a game console such as a Sony PlayStation®, a personal computer, etc.

Information may be exchanged over a network between the clients and servers. To this end and for security, servers and/or clients can include firewalls, load balancers, temporary storages, and proxies, and other network infrastructure for reliability and security. One or more servers may form an apparatus that implement methods of providing a secure community such as an online social website or gamer network to network members.

A processor may be a single- or multi-chip processor that can execute logic by means of various lines such as address lines, data lines, and control lines and registers and shift registers. A processor including a digital signal processor (DSP) may be an embodiment of circuitry. A processor system may include one or more processors.

Components included in one embodiment can be used in other embodiments in any appropriate combination. For example, any of the various components described herein and/or depicted in the Figures may be combined, interchanged, or excluded from other embodiments.

"A system having at least one of A, B, and C" (likewise "a system having at least one of A, B, or C" and "a system having at least one of A, B, C") includes systems that have A alone, B alone, C alone, A and B together, A and C together, B and C together, and/or A, B, and C together.

FIG. 1 illustrates a system in which first and second audio sources 100, 102 wirelessly communicate audio to first and second speakers 104, 106. The speakers 104, 106 are standalone speakers that are not parts of headphones. Each speaker 104, 106 receives and simultaneously plays audio from each source 100, 102. User or listener 108 can listen to stereo audio played by the speakers. While only two speakers and two sources are shown, it is to be understood that present principles may be extended to more than two sources and more than two speakers.

In one example, the first source 100 may be implemented by a cell phone and may send user-selected music to the speakers 104, 106 via a first wireless protocol such as Bluetooth. The second source 102 may be implemented by a wireless universal bus (USB) adapter connected to an audio source such as but not limited to a computer game console to send computer game audio and computer game chat to the speakers 104, 106 via a second wireless protocol such as a low latency protocol such as Wi-Fi or other protocol.

Figure 2:
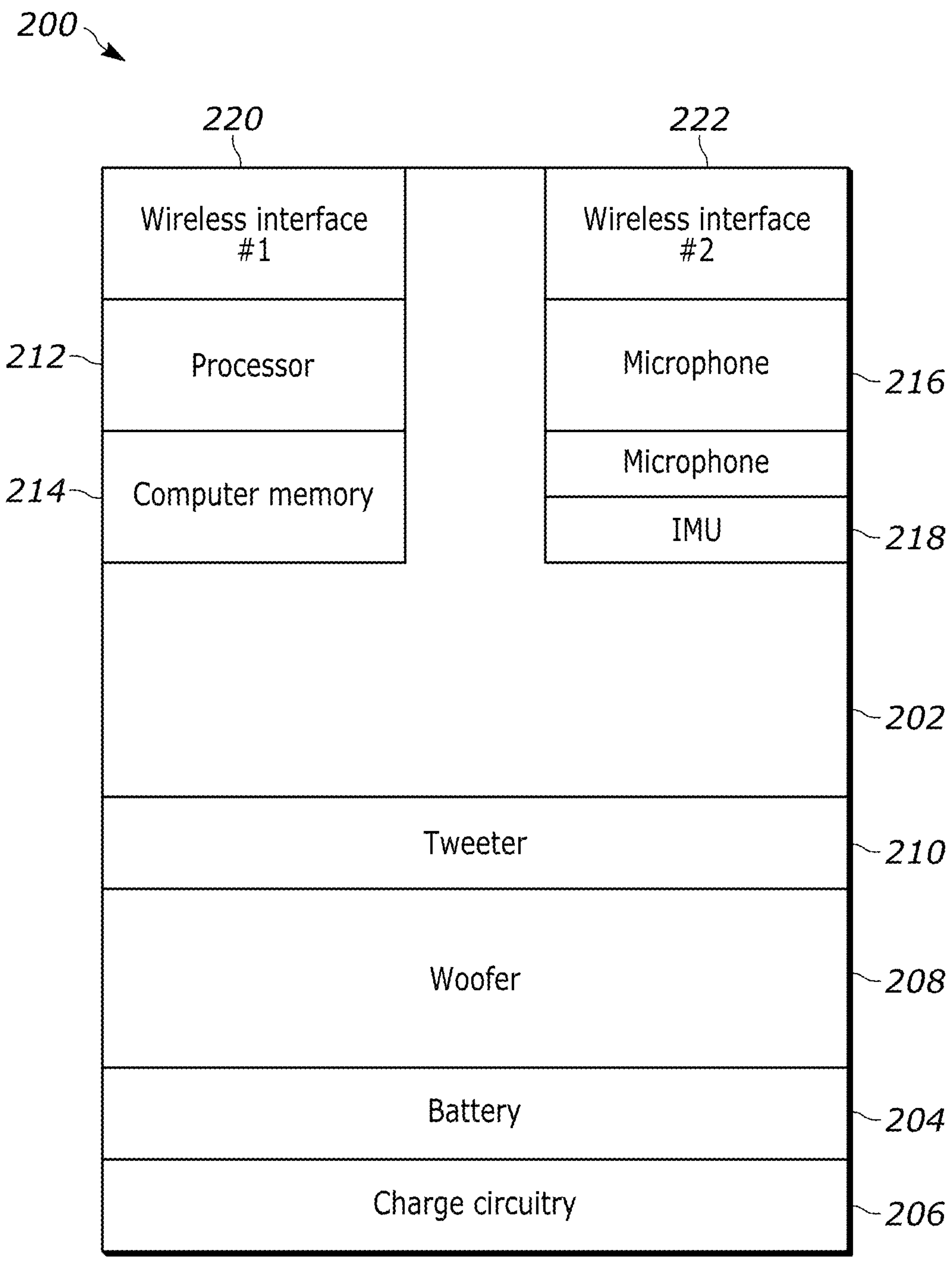
FIG. 2 is a block diagram of an example speaker consistent with present principles.

FIG. 2 illustrates an example speaker 200 consistent with present principles. A hollow plastic or metal speaker housing 202 supports at least one rechargeable battery 204 and charge circuitry 206 configured to charge the battery when engaged with a charger such as the dock described herein. The speaker 200 also includes at least one woofer 208 and at least one tweeter 210.

The speaker 200 may include various internal electronic control components including at least one processor 212 accessing instructions and data on computer memory 214. The speaker 200 also may include one or more microphones

216 (two microphones shown for example) as well as a motion sensor 218 such as an inertial measurement unit (IMU).

As alluded to above, the speaker 200 can include at least first and second wireless communication interfaces 220, 222 for communicating wirelessly with other devices using respective protocols.

Figure 3:
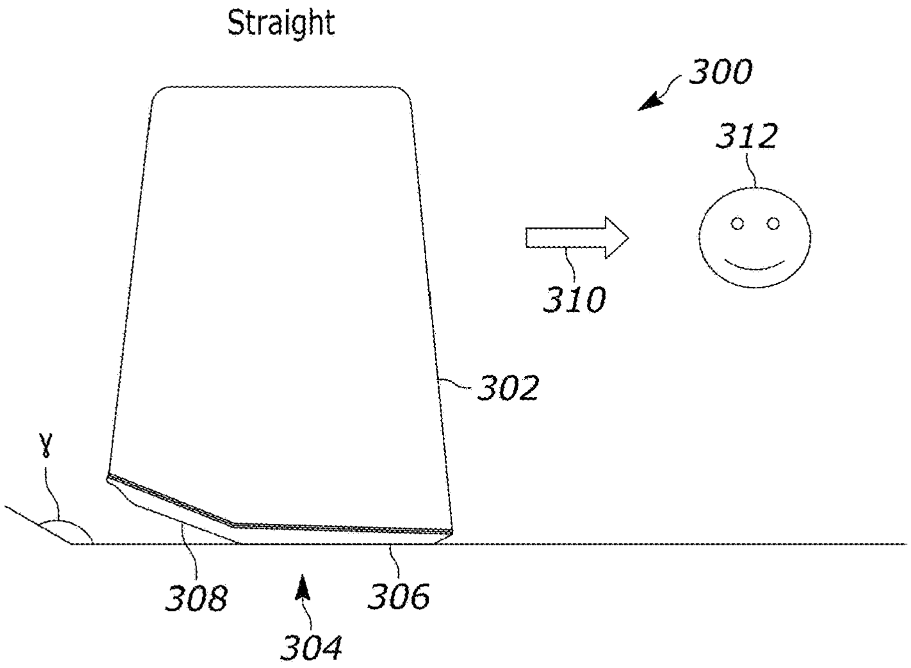
FIG. 3 is a side view of an example speaker in the upright orientation.
Figure 4:
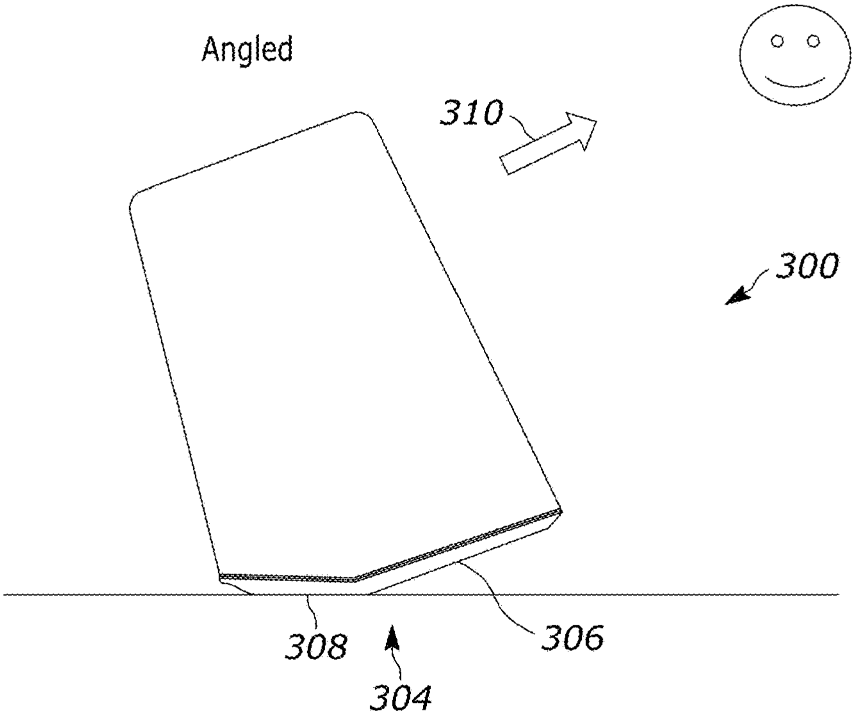
FIG. 4 is a side view of the speaker in FIG. 3 in the tilted orientation.

Refer now to FIGS. 3 and 4. A portable speaker 300 consistent with present principles includes a housing 302 that is tapered slightly inward from a base 304 of the speaker to the top of the speaker. The base 304 of the speaker may include at least two base surfaces and in the example shown includes an upright surface 306 and a tilt surface 308. The speaker can rest on either surface. The speaker 300 may be implemented by any speaker herein.

More specifically, as shown in FIG. 3, the speaker 300 can rest on the upright surface 306 to place the speaker in a substantially (within a few degrees such as five degrees) upright orientation, in which the sonic axis 310 of the speaker 300 is substantially (within a few degrees such as five degrees) horizontal to aim the sound at a listener 312 who is at the same approximate height as the speaker. The speaker can be tilted by hand to rest on the tilt surface 308 as shown in FIG. 4 to aim the sonic axis 310 upward toward the listener who is depicted as being above the speaker. When resting on the tilt surface 308 the speaker is in a tilted configuration as shown.

In the example shown, an obtuse angle α is established between the surfaces 306, 308.

Figure 5:
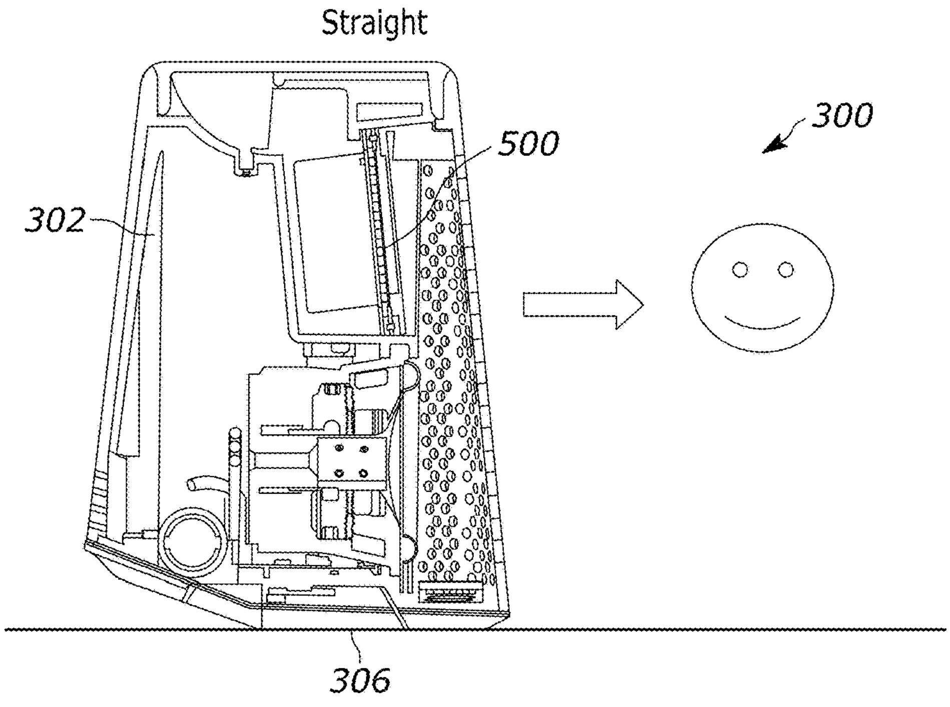
FIG. 5 is a cutaway side view of the speaker in the upright orientation.
Figure 6:
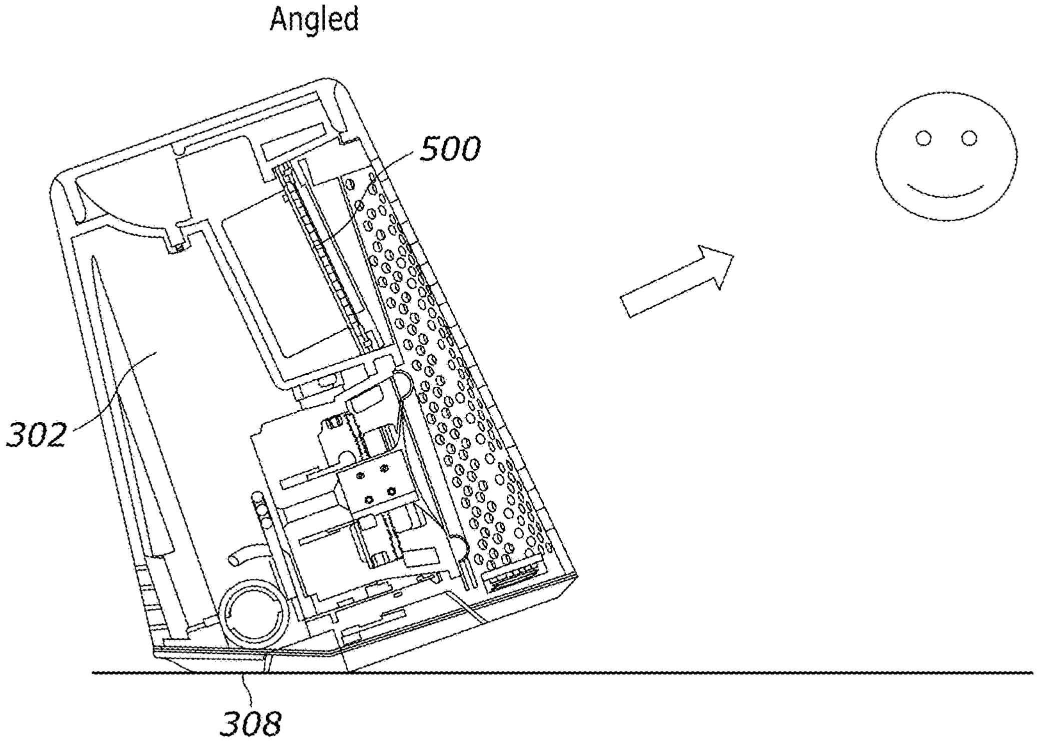
FIG. 6 is a cutaway side view of the speaker in FIG. 5 in the tilted orientation.

FIGS. 5 and 6 illustrate cutaway views of the speaker 300 respectively resting on the upright surface 306 (FIG. 5) and tilt surface 308 (FIG. 6). As shown in FIG. 5, when resting on the upright surface 306, the speaker is in the substantially upright orientation although the speaker driver 500, which may be a planar driver, is slightly tilted up within the speaker housing 302.

Figure 7:
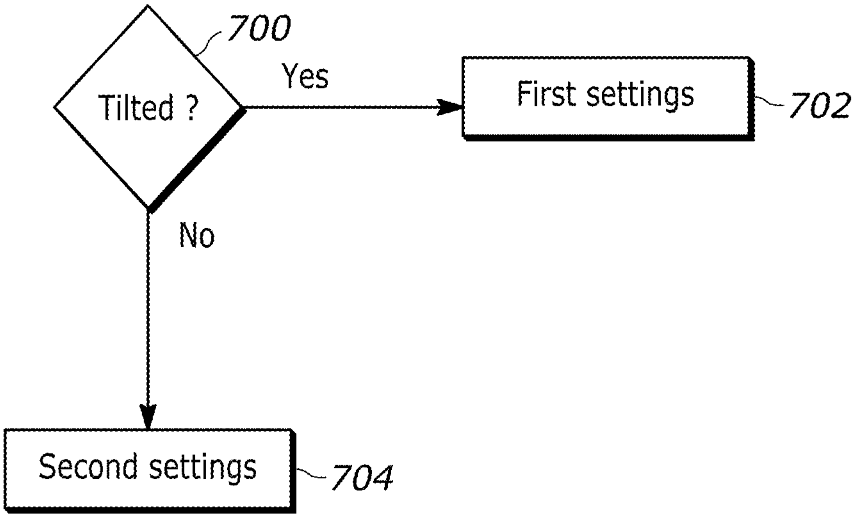
FIG. 7 illustrates example logic in example flow chart format consistent with FIGS. 3-6.

FIG. 7 illustrates additional features of the tilting speaker 300 shown in FIGS. 3-6. The logic of FIG. 7 may be executed by any processor system herein such as the processor 212 illustrated in FIG. 2.

Decision state 700 indicates that it is determined whether the speaker is in the upright orientation or tilt orientation. An indication of tilt may be provided by, e.g., the IMU 218 illustrated in FIG. 2. If the speaker is in the tilt orientation a first set of speaker settings may be applied at state 702, such as a first EQ and/or first volume, whereas if the speaker is in the upright orientation a second set of speaker settings may be applied at state 704, such as a second EQ and/or second volume. The user may define the speaker settings for each orientation if desired using a user interface (UI) presented on, e.g., a cell phone executing a settings app.

Figure 8:
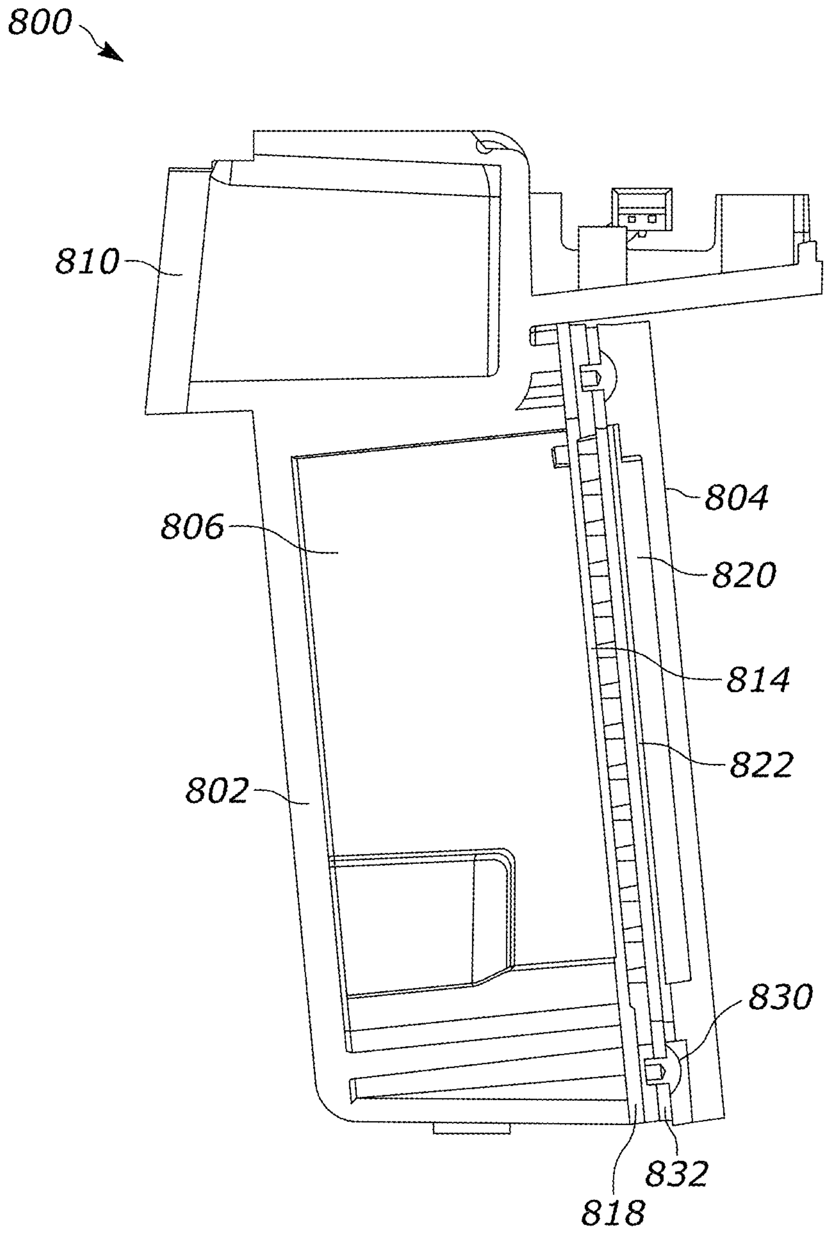
FIG. 8 is a cutaway side view of an example speaker illustrating planar driver components, with the acoustic fill block removed.
Figure 9:
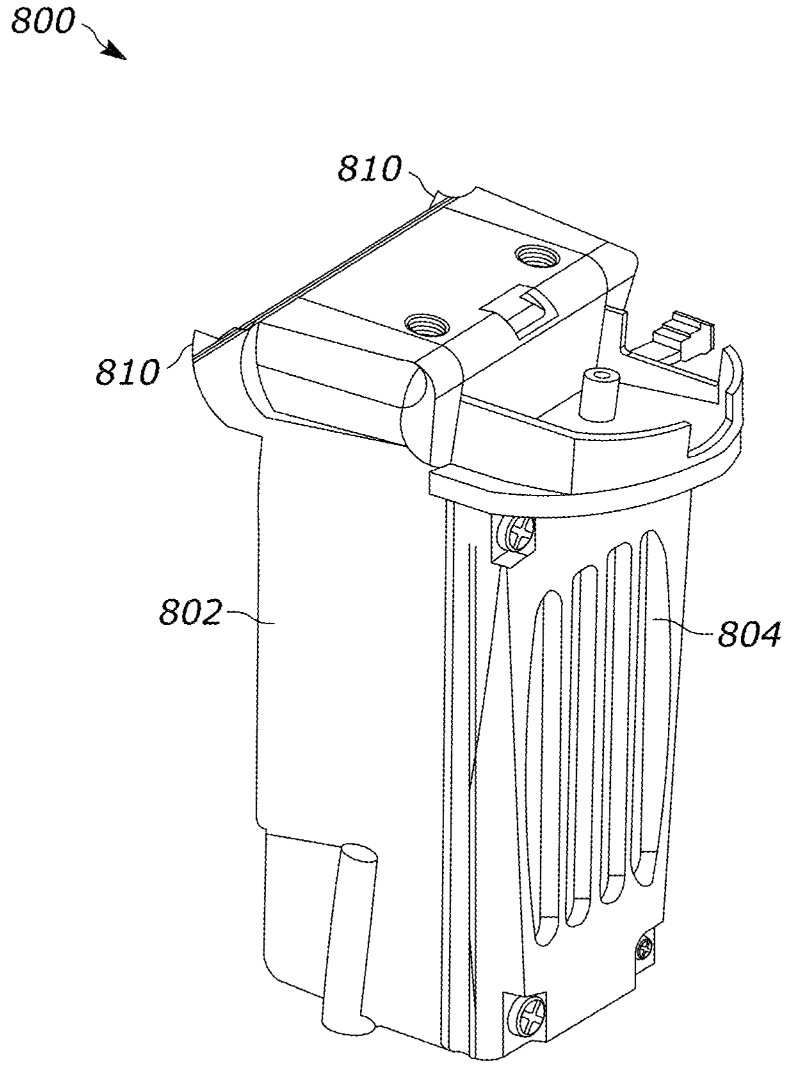
FIG. 9 is a perspective view of the speaker shown in FIG. 8.
Figure 10:
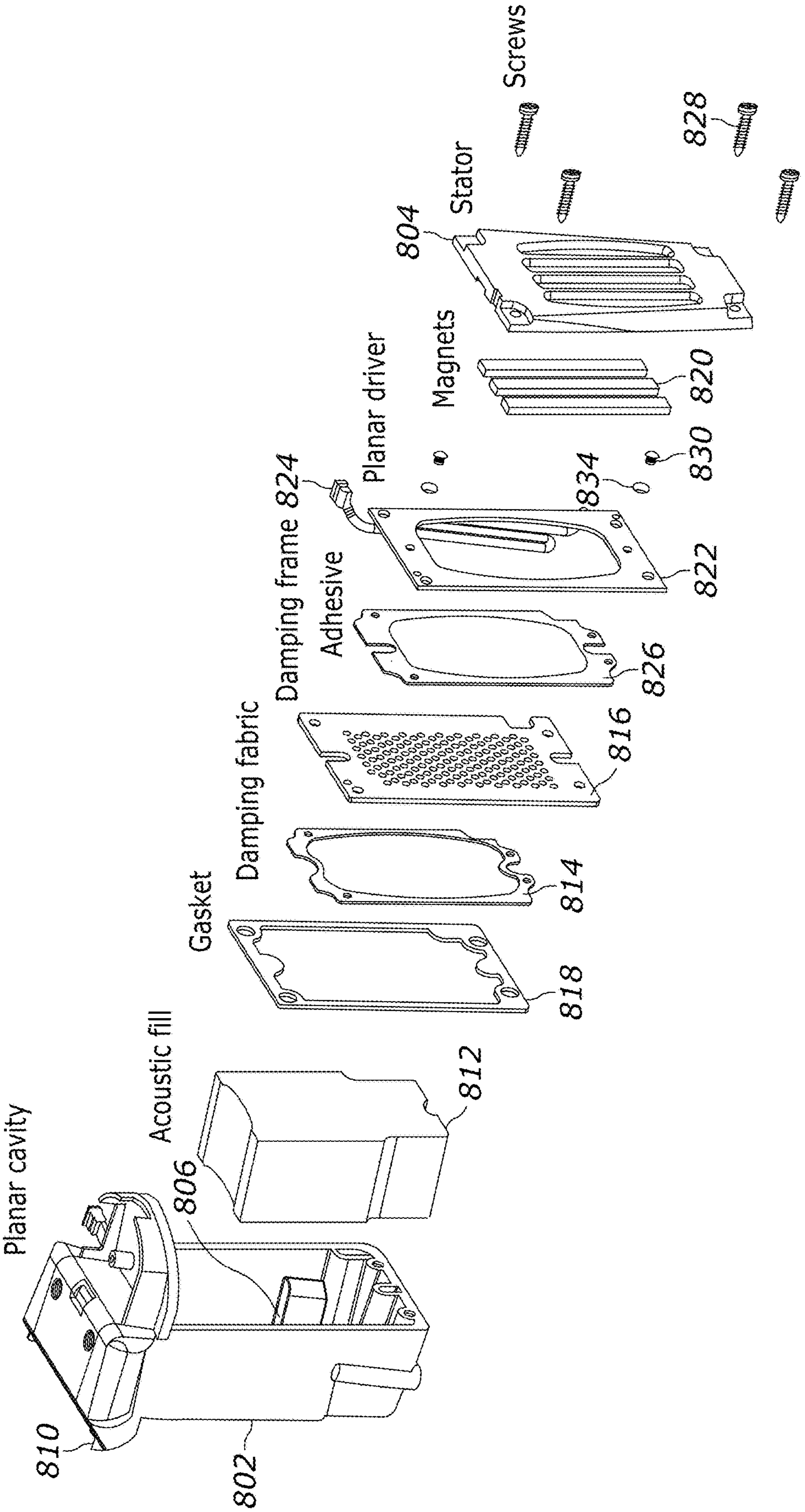
FIG. 10 is an exploded perspective view of the speaker shown in FIG. 8.

FIGS. 8-10 illustrate construction details of audio generating components of a speaker 800 consistent with present principles. The speaker 800 may be implemented by any speaker herein.

The front of a hollow housing 802 of the speaker 800 is covered by a stator 804. The housing 802 is formed with a generally parallelepiped-shaped cavity 806 sized to provide a low frequency resonance response, e.g., of around twenty Hertz (20 Hz), e.g., plus or minus ten percent. Or, the resonant frequency response may be between fifteen and forty Hertz. A top 808 of the housing covers the cavity 806 and is formed with left and right grippable handles 810 to assist in lifting and moving the speaker 800.

As shown best in FIG. 10, an acoustic fill block 812 which may be made of fiberglass may be disposed in the cavity 806 to smooth the acoustic response of the cavity. To further smooth the frequency response, a flat dampening fabric 814 which may be flush with a solid rectangular frame 816 can cover the front of the acoustic fill block 812. The frame 816 with fabric 814 may be connected to the housing by a hollow rectangular gasket 818.

One or more permanent magnets 820 may be placed against the inside surface of the stator 804. In one embodiment the magnets 820 are glued to the stator 804.

Between the magnets 820 and damping frame 816 is a planar magnetic driver 822 that may be connected via wires 824 to electrical circuitry described further below. The planar driver 824 may be flat and may be configured in a hollow parallelepiped shape as shown. A diaphragm may be established by the hollow driver and/or a continuous diaphragm film (not shown) may be disposed within the periphery of the driver. The driver drives a woofer and/or tweeter in the housing. Adhesive 826 may be used to bond the driver 824 to the damping frame 816. Screws 828 may extend through the corners of the rectilinear components as shown to hold the stator 804 with intervening components onto the housing 802. The planar driver may generate sound at a frequency in the range of six hundred Hertz to twenty thousand Hertz (600 Hz-20 kHz), inclusive.

As perhaps best shown in cross-reference to FIGS. 8 and 10, metal connectors such as rivets 830 extend through the top and bottom edges of the planar driver 822 to create an electrical connection between the driver and a printed circuit board (PCB) 832 used to control the driver. Washers 834 around the rivet shanks prevent tearing the film of the driver.

Figure 11:
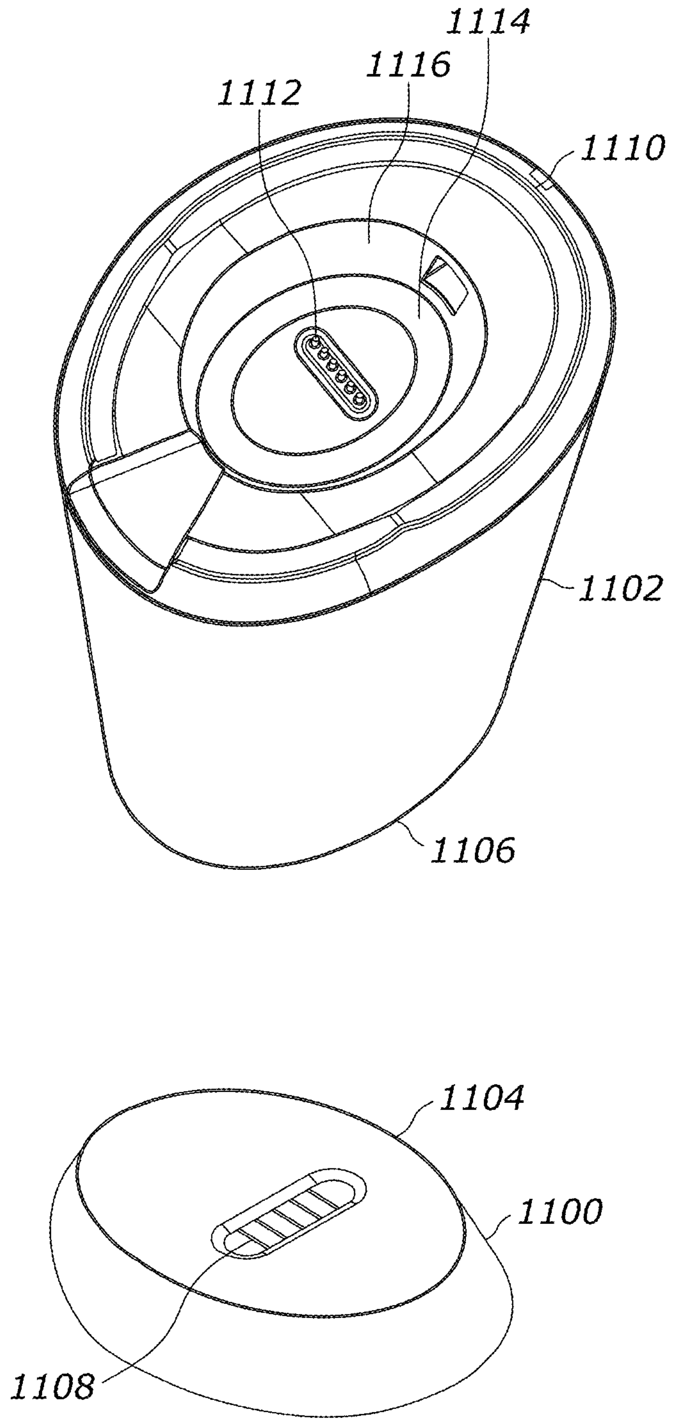
FIG. 11 is a perspective view of a speaker consistent with present principles in an exploded relationship to a charging dock.
Figure 12:
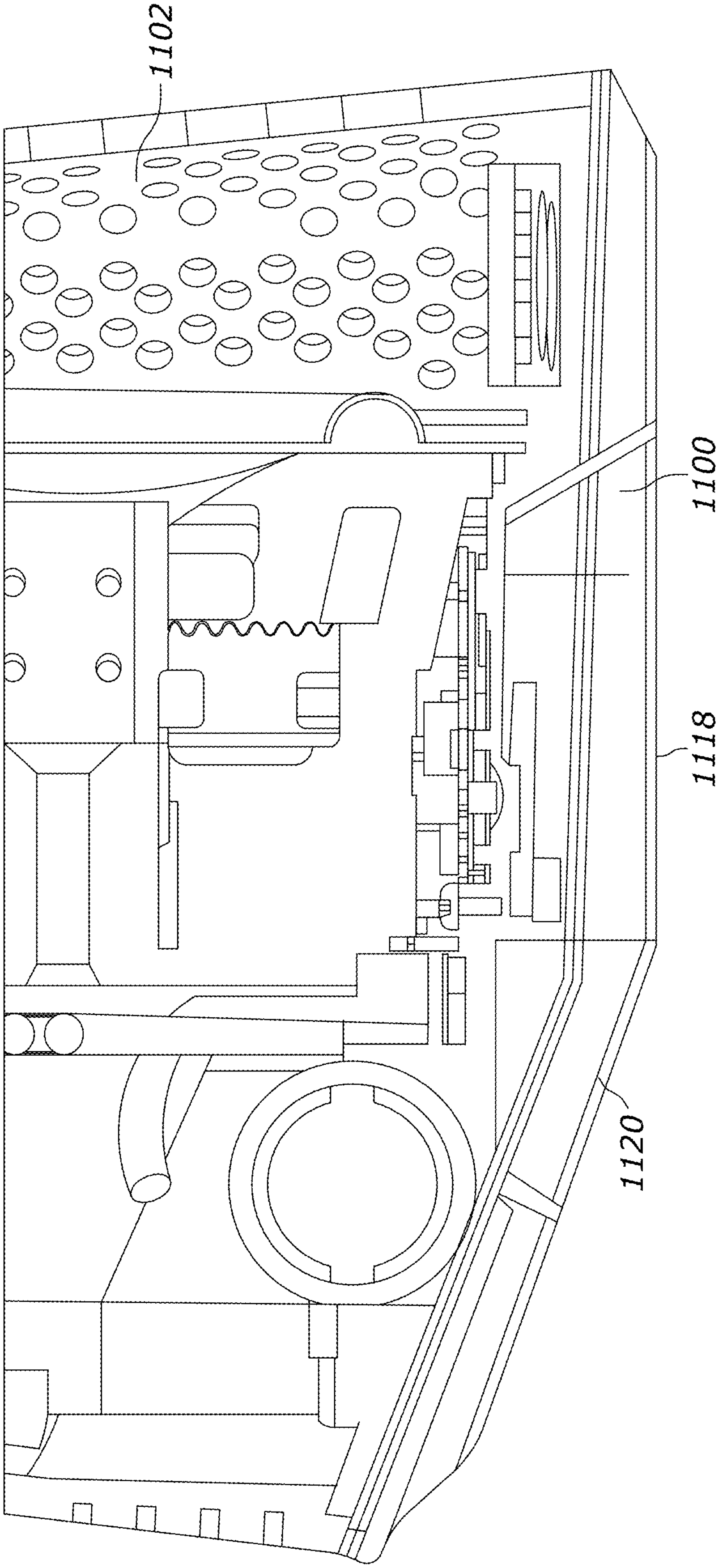
FIG. 12 is a cutaway side view of the bottom of the speaker shown in FIG. 11 engaged with the dock.

FIGS. 11 and 12 illustrate details of an example charging dock 1100 for any of the wireless portable speakers 1102 described herein. As shown, the dock 1100 includes a top surface with a curved outer periphery 1104 configured similar to the periphery 1106 of the speaker 1102, which may be generally ovular. If desired, the top surface of the dock 1100 may be flat, it may be stepped, or it may be slightly concave or slightly convex. It is to be understood that the dock 1100 includes charge circuitry including a printed circuit board (PCB) for transforming electricity from the grid to charge current to recharge the battery within the speaker 1102.

In the example shown in FIG. 11, a single row of plural (e.g., six) electrical contacts 1108 is exposed on the top surface of the dock. The contacts 1108 are electrically engaged with the PCB to charge the battery within the speaker 1102.

The bottom 1110 of the speaker 1102 a single row of plural (e.g., six) pogo pins 1112 to register with and electrically contact respective contacts 1108 of the dock 1100. In the specific embodiment shown, the row of pogo pins 1112 on the bottom of the speaker 1102 are located in a recess 1114 in the bottom 1110 of the speaker 1102, with the recess 1114 being configured and sized to snugly receive the periphery 1104 of the dock 1100. In some examples the continuous curved wall of the recess 1114 is lined with a resilient material 1116 such as rubber to prevent buzz and rattle. The recess 1114 may be generally ovular in shape as may be the dock 1100.

FIG. 12 is a side cutaway view of the bottom portion of the speaker 1102 snugly engaged with the dock 1100 within the recess 1114. As shown in FIG. 12, the dock 1100 can include at least two base surfaces and in the example shown includes an upright surface 1118 and a tilt surface 1120. The dock when engaged with the speaker can rest on either surface 1118, 1120 of the dock. More specifically, the dock 1100 can rest on the upright surface 1118 to place the speaker in the substantially upright orientation shown in FIGS. 3, 5, and 12. The dock with speaker can be tilted by hand to rest on the tilt surface 1120 to place the speaker 1100 in the tilted configuration shown in FIGS. 4 and 6. In the example shown, an obtuse angle is established between the surfaces 1118, 1120 of the dock 1100 and may be the same angle as the angle $\alpha$ between the surfaces 306, 308 of the speaker shown in FIG. 3.

Figure 13:
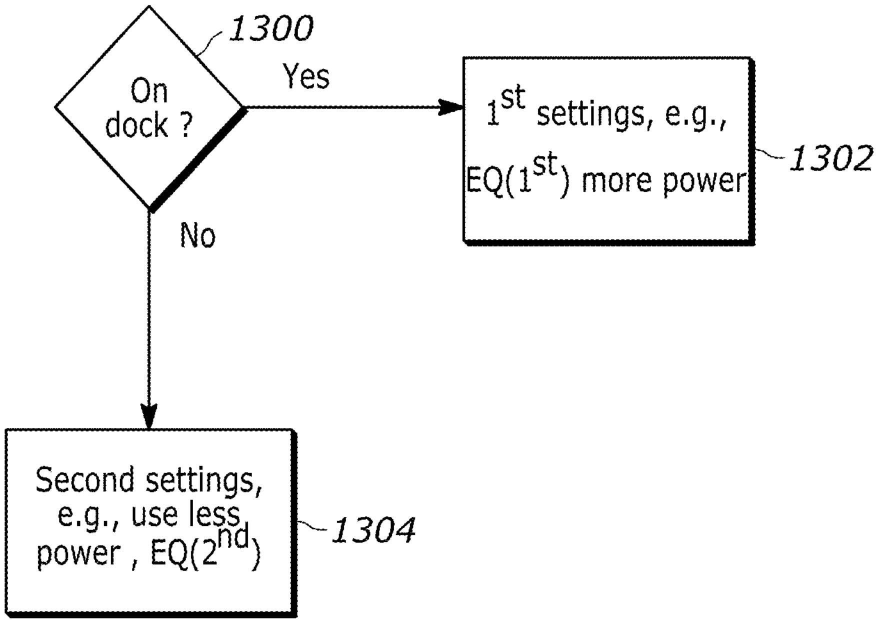
FIG. 13 illustrates example logic in example flow chart format consistent with FIGS. 11 and 12.

FIG. 13 illustrates additional features of the dock. The logic of FIG. 13 may be executed by any processor system herein such as the processor 212 illustrated in FIG. 2.

Decision state 1300 indicates that it is determined whether the speaker is engaged with the dock as indicated by, e.g., electrical contact of the pogo pins of the speakers with the contacts of the dock. If the speaker is engaged with the dock a first set of speaker settings may be applied at state 1302, such as a first EQ and/or first (higher) power, whereas if the speaker is not engaged with the dock a second set of speaker settings may be applied at state 1304, such as a second EQ and/or second (lower) power. The user may define the speaker settings for each dock situation if desired using a UI presented on, e.g., a cell phone executing a settings app.

Figure 14:
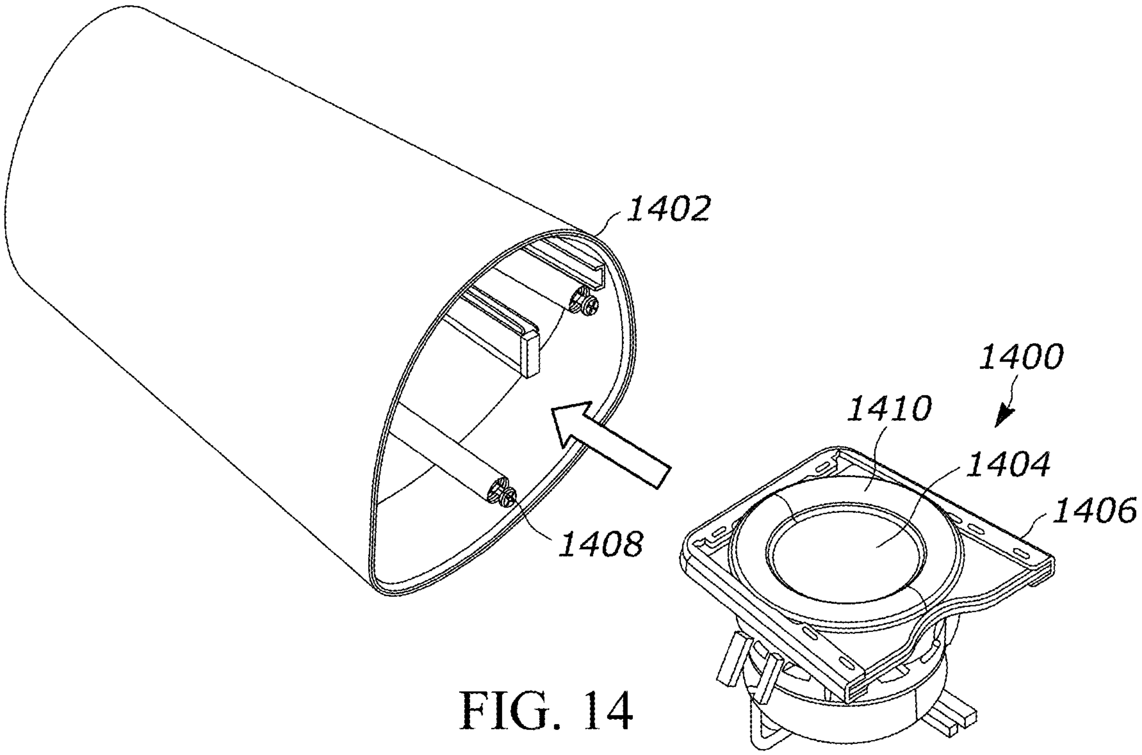
FIG. 14 is a perspective view of a speaker housing consistent with present principles in an exploded relationship to a woofer.
Figure 15:
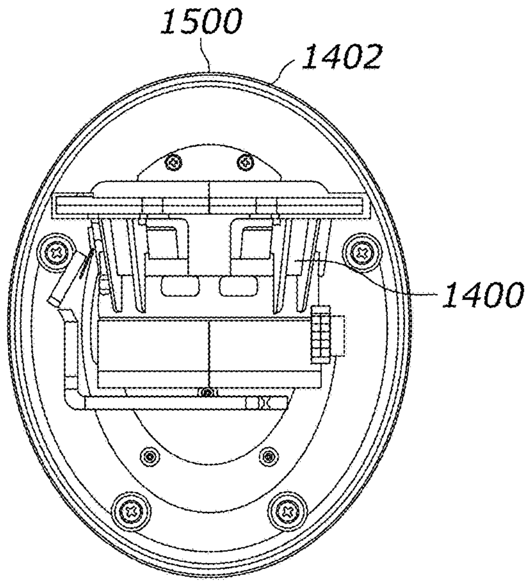
FIG. 15 illustrates an end view of the woofer of FIG. 14 inside the housing.
Figure 16:
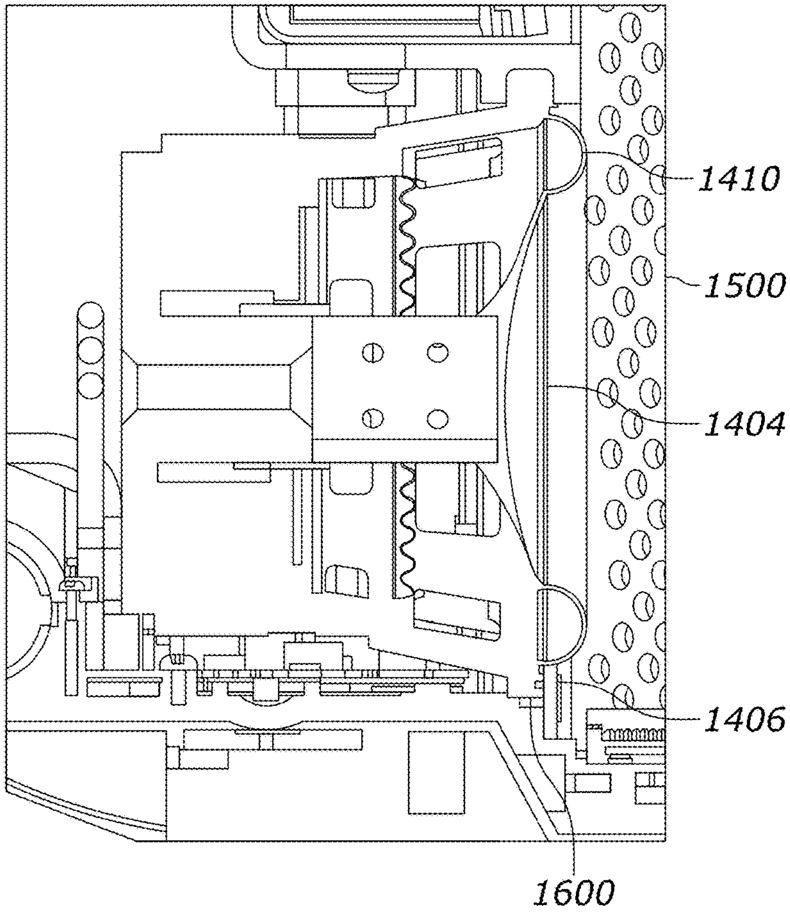
FIG. 16 is a side view of the woofer in the housing, with portions of the housing cut away for clarity.

Now refer to FIGS. 14-16 which illustrate a woofer assembly 1400 that may be mounted in a speaker 1402 such as any speaker herein. The woofer assembly 1400 includes a woofer 1404 surrounded by a flat, rectilinear or slightly trapezoidal plastic frame 1406 the edges of which are received between longitudinal ribs 1408 on the inside wall of the housing of the speaker 1402, in effect slotting the woofer into the housing with opposed edges of the frame being in a friction fit with the housing. The woofer 1404 may be wrapped (surrounded by) a circular foam 1410 on the periphery of the woofer to create seal with the wall 1500 (FIGS. 15 and 16) of the speaker housing.

In the example shown, the woofer assembly 1400 is mounted in a bottom segment of the speaker 1402 facing transversely outward, i.e., facing the wall 1500 (FIGS. 15 and 16) of the speaker 1402. Gaskets 1600 (FIG. 16) seal the bottom of the woofer assembly to the speaker housing.

Figure 17:
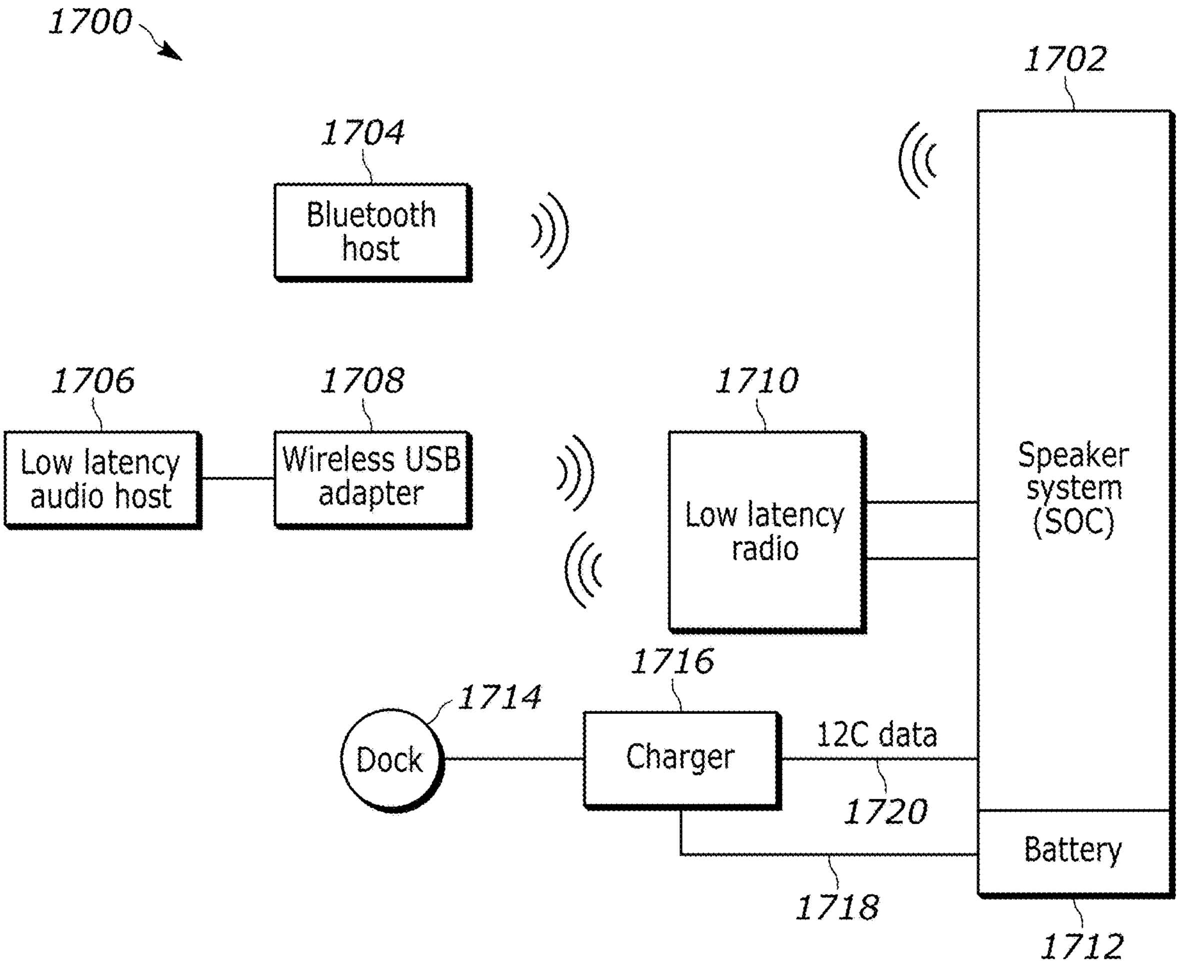
FIG. 17 is a block diagram of plural audio host devices communicating wirelessly with a system on a chip (SOC) of a speaker consistent with present principles.
Figure 18:
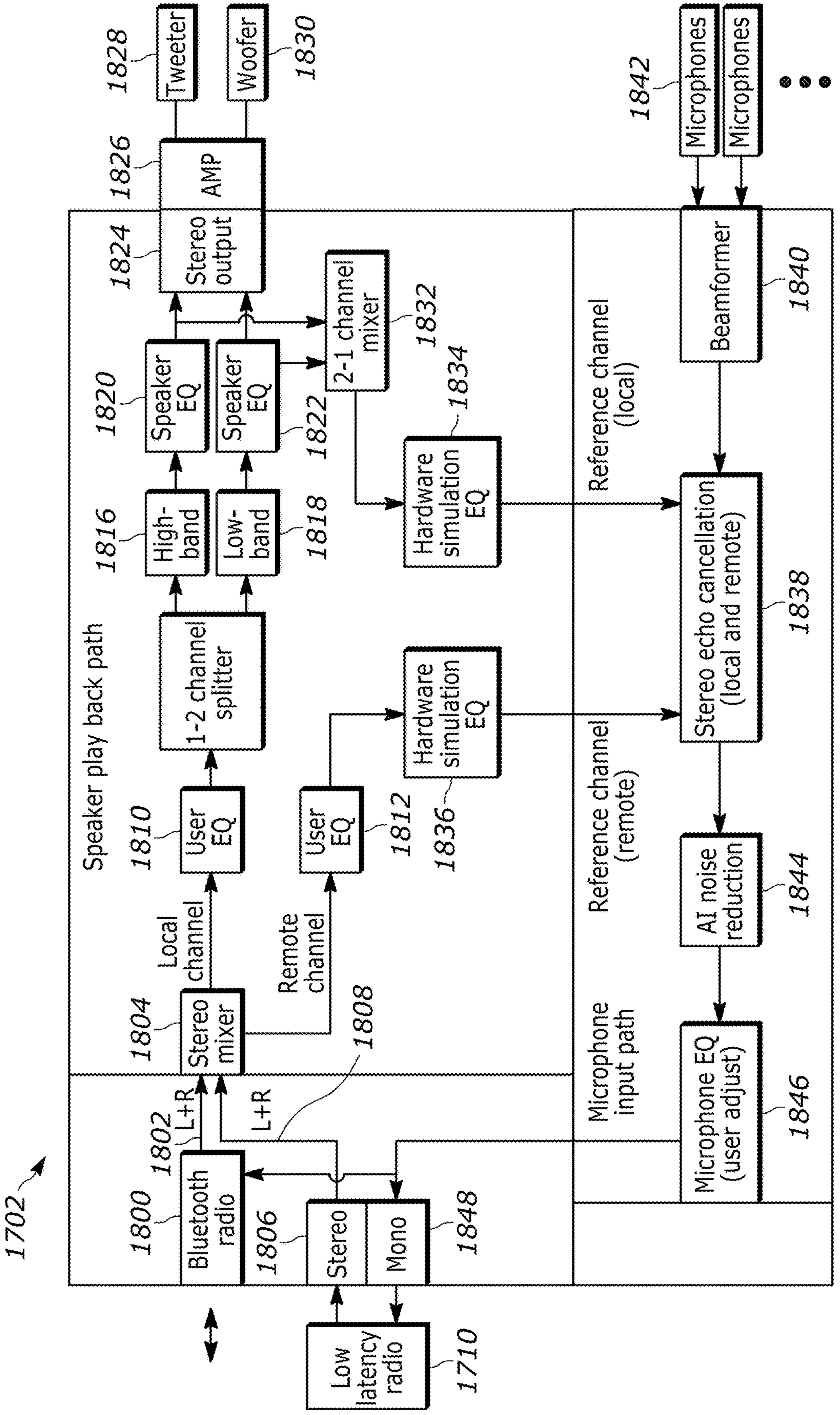
FIG. 18 illustrates details of the SOC of FIG. 17.
Figure 19:
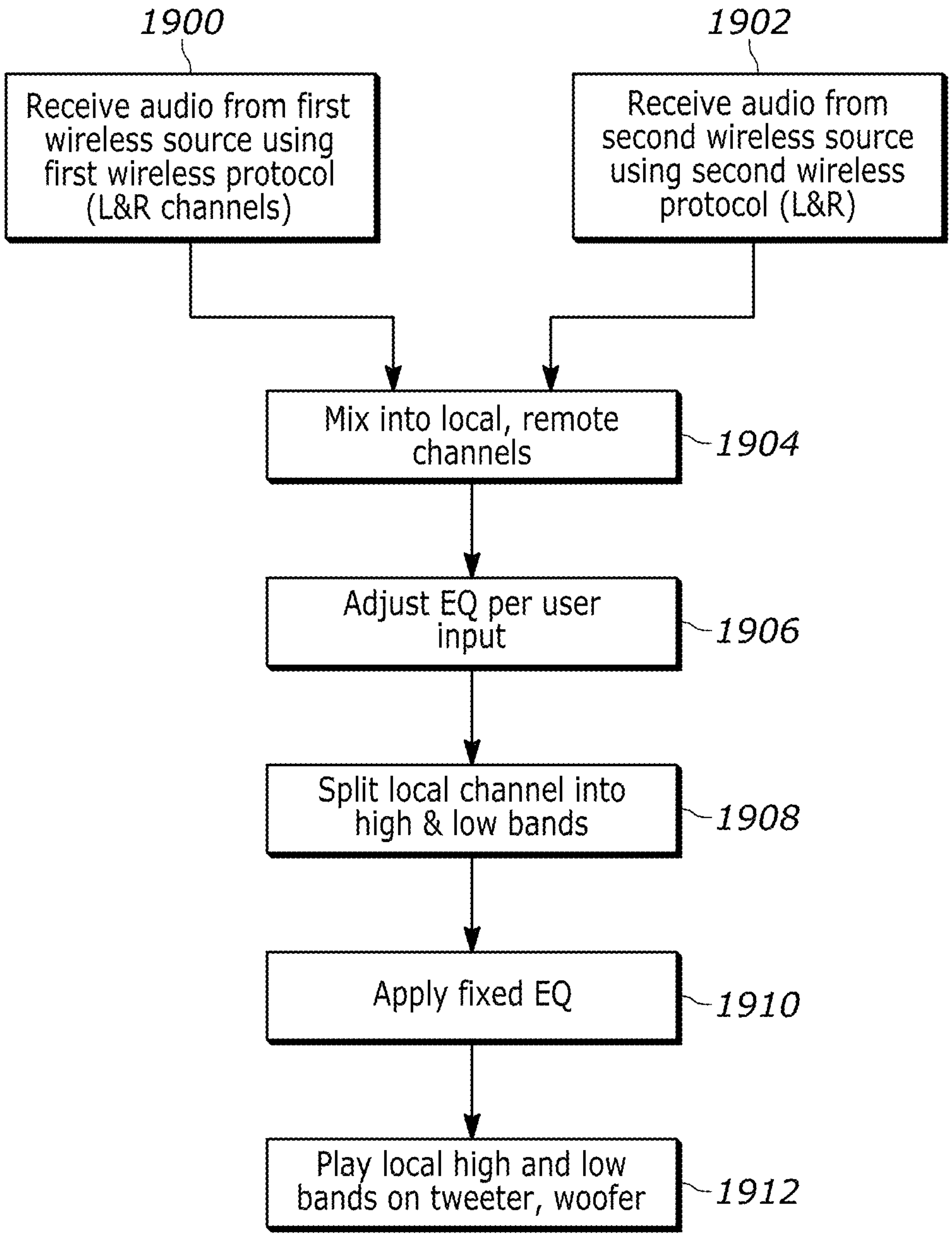
FIG. 19 illustrates example logic in example flow chart format consistent with FIG. 18, illustrating playing of local audio.

Turn now to FIGS. 17 and 18 for an understanding of signal processing to facilitate use of stereo speakers to listen to music, game audio, chat audio, and talk to friends at same time. FIG. 17 illustrates a single speaker 1700 that includes circuitry 1702 which in some non-limiting examples may be implemented by a system on a chip (SOC). It is to be understood that the circuitry 1702 may implement hardware components exclusively and/or software components exclusively and/or a combination of hardware and software.

In the description herein the "local" channel refers to an audio channel to be played on the speaker 1700 while the "emote" channel refers to the audio that is to be played on the other speaker (not shown) and that is used by the speaker 1700 for purposes to be shortly described. The two speakers that establish the stereo system may be identical in construction and operation, or one speaker may include a few components such as a microphone that the other speaker does not have.

As shown, a first audio host device 1704 communicates wirelessly with the speaker 1700. The first audio host device may be implemented by a Bluetooth-enabled device such as a wireless phone. Also, a second audio host device 1706 communicates wirelessly, e.g., via a wireless USB adaptor 1708, with a low latency radio 1710 that can be part of the speaker 1700 but that may not reside physically on the circuitry 1702. The second audio host 1706 may be implemented by a computer game console, as an example.

The circuitry 1702 and remainder of the components of the speaker 1700 are energized by one or more rechargeable batteries 1712. To this end, speaker 1700 may be engaged with a dock 1714 such as any dock described herein that includes a charger circuit 1716 to recharge the batter 1712 through a charging connection 1718. The charger 1716 also may exchange data regarding battery charge with the speaker via a data link 1720 such as but not limited to an inter-integrated circuit (I2C) link.

Turn now to FIG. 18 for an understanding of an example embodiment of the circuitry 1702 shown in FIG. 17. A radio 1800 communicates wirelessly with the first audio host 1704 using the Bluetooth protocol when the communication protocol of the first host is Bluetooth, it being understood that the radio 1800 may employ a different protocol as appropriate to communicate with the first host 1704 using whatever protocol the first host uses. A left and right audio channel 1802 is sent from the radio 1800 to a stereo mixer 1804.

Similarly, a stereo input 1806 receives a left and right channel audio channel 1808 from the low latency radio 1710 and sends its L&R channel 1808 to the stereo mixer 1804. In one non-limiting example, the input 1806 may be implemented by an inter-integrated circuit sound (I2S) input operating at 16 bits and 48 KHz.

The stereo mixer outputs a local channel to a first user-adjustable EQ block 1810 (or user EQ for short) to establish the EQ of the local channel. As mentioned above, the local channel contains audio intended to be played on the speaker 1700. In a non-limiting example the user EQ 1810 may be a ten-band adjustable EQ block.

Furthermore, the stereo mixer 1804 outputs a remote channel to second a user-adjustable EQ block 1812 to establish the EQ of the remote channel. As mentioned above, the remote channel contains audio intended to be played on the counterpart speaker (not shown) to the speaker 1700.

Following the signal path from the first (local channel) user EQ 1810, the now-equalized local channel is sent to a one-to-two splitter 1814 which splits the local channel into a high band channel 1816 and a low band channel 1818. This can be implemented using a Linkwitz-Relly crossover. The high band channel 1816 is sent to a high band speaker EQ block 1820, which performs an equalization on the high band channel to accommodates inherent balance issue in the speaker/driver to give a default flat response. Note that the user-adjusted EQ is "on top" of the speaker EQ.

On the other hand, the low band channel 1818 is sent to a low band speaker EQ block 1822, which performs an equalization on the low band channel to accommodates inherent balance issue in the speaker/driver to give a default flat response. Note that the user-adjusted EQ is "on top" of the speaker EQ. Both speaker EQs 1820, 1822 may be ten-band EQ blocks.

The outputs of the speaker EQs 1820, 1822 are sent to a stereo output block 1824 which outputs the high and low channels to a 2-channel amplifier 1826 to be amplified and thence to a respective tweeter 1828 and woofer 1830 for playing the local channel audio which, recall, is a mix of the audio received from the first and second audio sources 1704, 1706 shown in FIG. 17. The stereo output block may implement a 48 KHz 16-bit I2S audio output.

As further shown in FIG. 18, the outputs of the speaker EQs 1820, 1822 also are sent to a two-to-one mixer 1832, which mixes the high and low local channels into a single channel. The output of the mixer 1832 is sent to a local hardware simulation EQ block 1834 to implement further (nonuser-adjustable) equalization on the single local channel.

Returning to the remote channel branch from the stereo mixer 1804, the output of the user-adjustable EQ block 1812 that enables a user to modify the EQ of the remote channel is sent to a hardware simulation EQ block 1836 to implement further (nonuser-adjustable) equalization on the single remote channel. The HW EQ blocks 1834, 1836 estimate the frequency response for the respective opposite other channel to generate a reference frequency spectrum representing what both channels are doing.

Thus, the outputs of both HW simulation EQ blocks 1834, 1836 are sent as reference signals to a stereo echo cancelation block 1838. The echo cancelation block 1838 performs echo cancelation of a signal from a beamformer 1840 that performs beamforming on its input, namely, the output of plural (in the example shown, two) microphones 1842 that may be mounted on the speaker to support, e.g., verbal game chat. This processing is used for canceling the opposite channel. For instance, if a user is trying to talk to teammates, the sound coming out of the speakers may include game/chat audio from the low latency source 1706 shown in FIG. 17 plus music from the Bluetooth host 1704, and recognizing that the microphones 1842 mikes pick up all of the speaker sounds, the echo cancelation block 1838 isolates the audio mix to just the gamer's voice, rejecting both the local and remote channel audio.

The microphones 1842 may output 16 KHz 16-bit audio.

After echo cancelation, the output of the stereo echo cancelation block 1838 is sent to an artificial intelligence (AI) noise reduction block 1844 to reduce noise in the signal in accordance with further disclosure below and more particularly to isolate voice audio from other sounds. Note that a conventional (non-AI) noise cancelation block alternatively may be employed.

After noise cancelation, the microphone signal is sent to a user-adjustable EQ block 1846 to enable a user to adjust the equalization of the now-isolated voice signal. After implementing user-adjusted EQ, the microphone signal is sent to an output port 1848 that may be a mono I2S operating at 16 KHz and 16-bits. The I2S microphone signal is provided to the low latency radio 1710 for transmission to the low latency audio source 1706 shown in FIG. 17.

FIGS. 19-23 amplify on FIGS. 17 and 18 using flow chart and UI format. At indicated at state 1900 in FIG. 19, audio is received from the first wireless audio source, typically using a first wireless protocol. Also, at state 1902 and simultaneously with state 1900 audio is received from the second wireless audio source, typically using a second wireless protocol. The two audio streams are mixed at state 1904 into local and remote channels by each speaker.

State 1906 indicates that the EQ of both the local and remote channels may be adjusted by a user. Then, at state 1908 the local channel is split into high and low bands to which are applied a fixed, speaker-specific EQ at state 1910. The high and low bands are amplified and played respectively on the tweeter and woofer of the speaker at state 1912.

Figure 20:
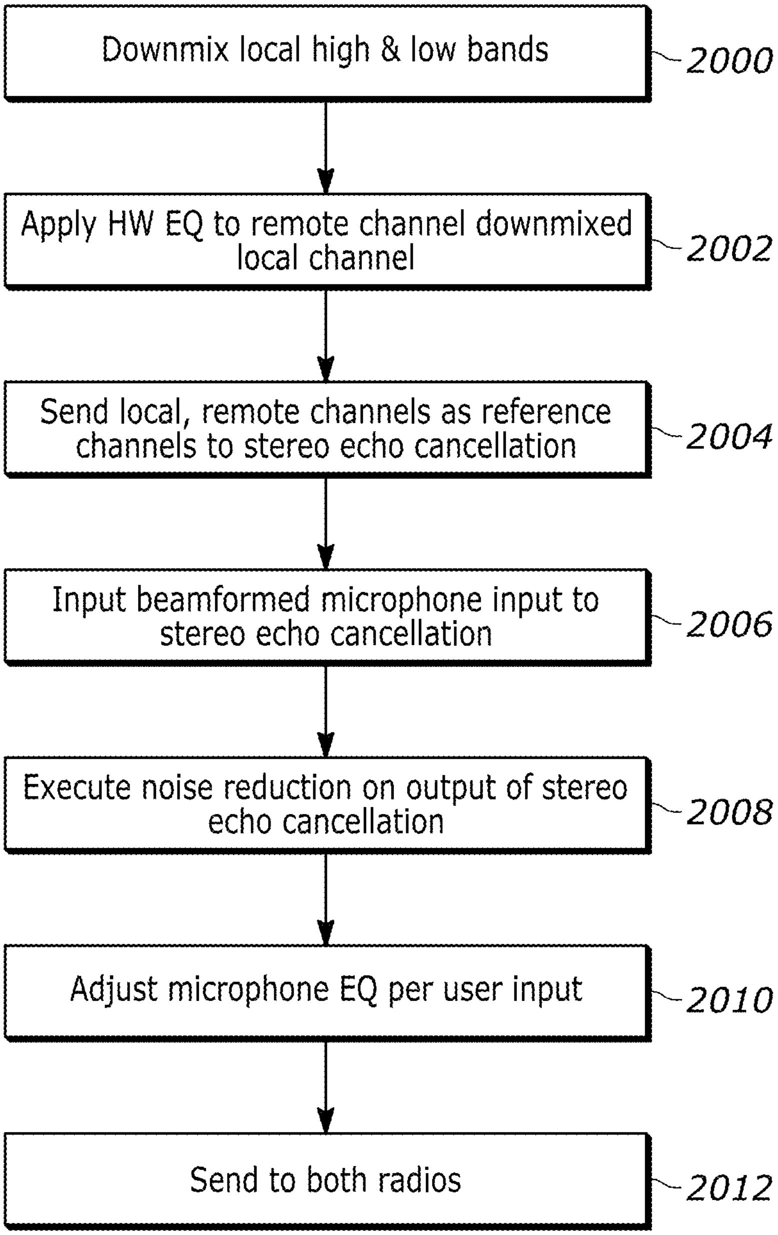
FIG. 20 illustrates example logic in example flow chart format consistent with FIG. 18, illustrating processing of remote audio.

FIG. 20 continues the description of isolating voice signals from the microphones. State 2000 indicates that the local high and low bands are down mixed. Moving to state 2002 a HW-dependent EQ is applied to the remote channel and the downmixed local channel. Proceeding to state 2004 the local and remote channels are then used as reference channels for echo cancelation of the beamformed microphone signals as indicated at state 2006. Noise reduction (voice isolation) is executed at state 2008.

Moving to state 2010 the EQ of the voice signals input by means of the microphones is adjusted according to user input. The voice signals are sent to both radios at state 2012 for wireless communication of the voice signals to the audio sources.

Figure 21:
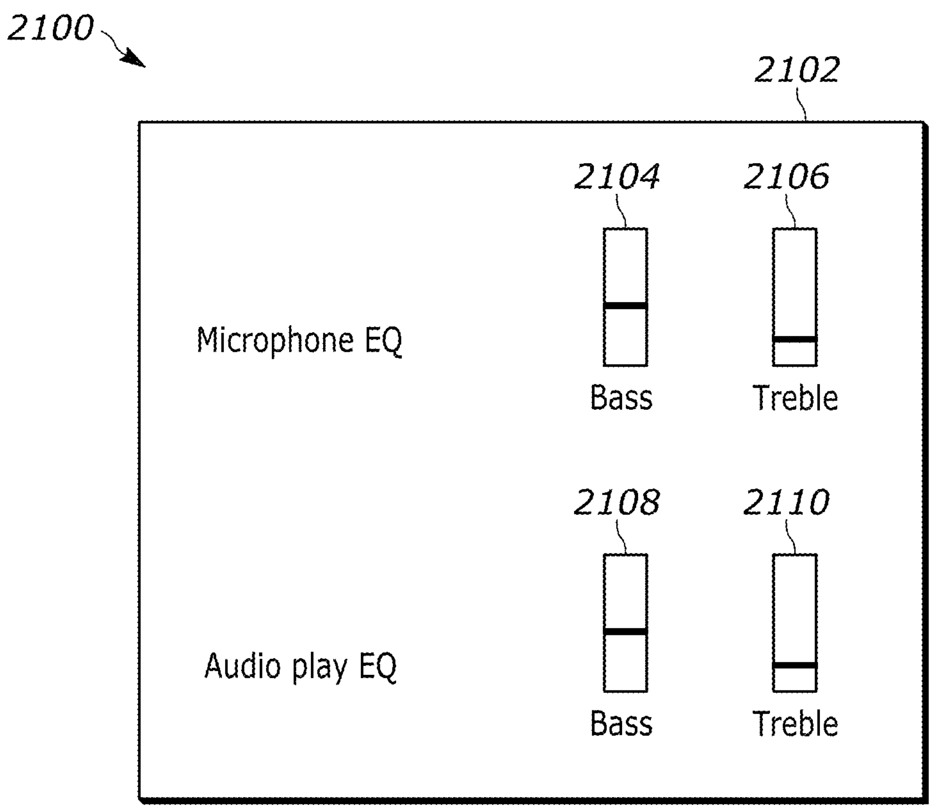
FIG. 21 is a screen shot of an example user interface (UI) for input of user-adjusted EQ.

FIG. 21 illustrates a UI 2100 that may be presented on a display 2102 such as any display herein (e.g., the display of the cell phone or the display on which the game console presents games). As shown, the UI 2100 may include EQ adjustment sliders to adjust both microphone EQ and audio play EQ consistent with FIGS. 17-20. In the specific non-limiting embodiment shown, the UI 2100 includes a bass adjustment slider 2104 to adjust the microphone bass and a treble adjustment slider 2106 to adjust the microphone treble. Moreover, the example UI 2100 includes a bass adjustment slider 2108 to adjust the audio bass and a treble adjustment slider 2110 to adjust the audio treble. It is to be understood that fewer or greater EQ adjustment elements may be provided than shown in the example UI of FIG. 21.

Figure 22:
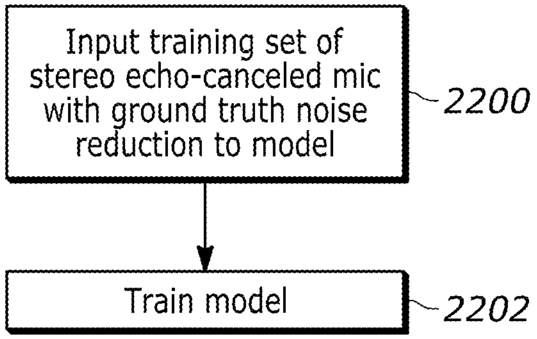
FIG. 22 illustrates example logic in example flow chart format for training the noise reducer module shown in FIG. 18.
Figure 23:
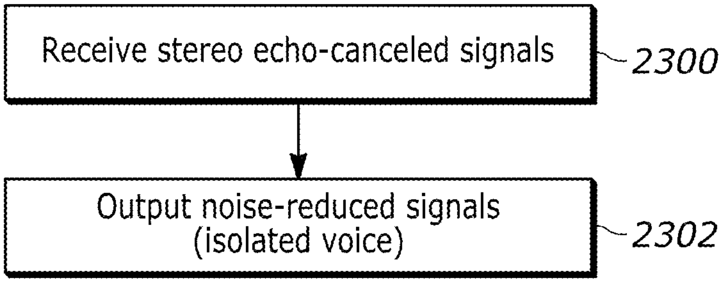
FIG. 23 illustrates example logic in example flow chart format for using after training the noise reducer module shown in FIG. 18.
Figure 24:
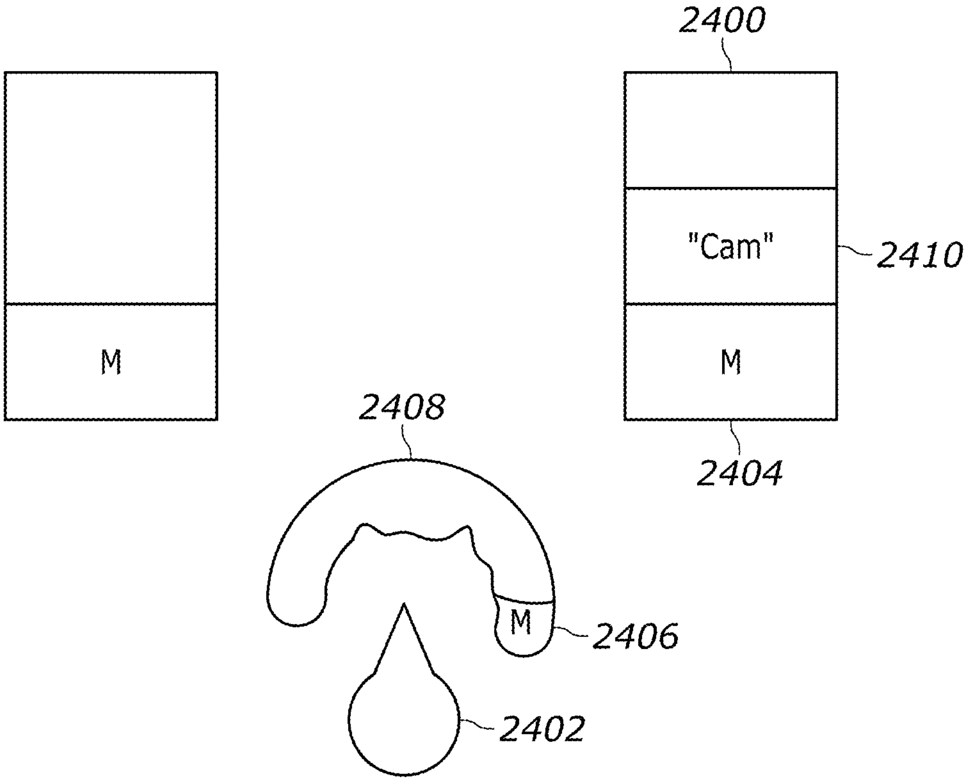
FIG. 24 is a schematic diagram of an example system for illustrating varying speaker settings based on user location.

FIGS. 22 and 23 illustrate logic pertaining to the noise reduction block of FIG. 18. Commencing at state 2200 in FIG. 22, a training set of data is input to a machine learning (ML) model to train the model at state 2202. The training set of data can include stereo echo-canceled signals with ground truth noise reduction (ground truth isolated voice sound tracks).

Then in operation stereo echo-canceled signals are received at state 2300 into the ML model. In response, noise-reduced signals, essentially isolated voice signals, are output from the ML model at state 2302.

Turning to FIGS. 24-28, for most stereo speakers 2400, there is a "sweet spot" of where the listener 2402 should best sit for the optimal sound. As described herein, one or more speakers 2400 supports one or more microphones 2404 for voice chat. By using the microphone 2404 on the speaker as well as potentially a microphone 2406 on a game controller 2408, the opportunity presents itself to adjust specific parameters of the speaker to keep the "sweet spot" centered on wherever the listener moves. For example, speaker volume, left/right balance, EQ, delay between speakers (e.g., by increasing delay as the listener moves away from the system centerline and decreasing delay as the user moves toward the centerline), and microphone gain (e.g., by increasing the gain of a speaker being moved away from decreasing the gain of the speaker being moved toward) can be adjusted to optimize the playing and speaking experience automatically for the player/listener 2402. Speaker adjustment may be done during game play or in-game, i.e., by the game engine itself.

Figure 25:
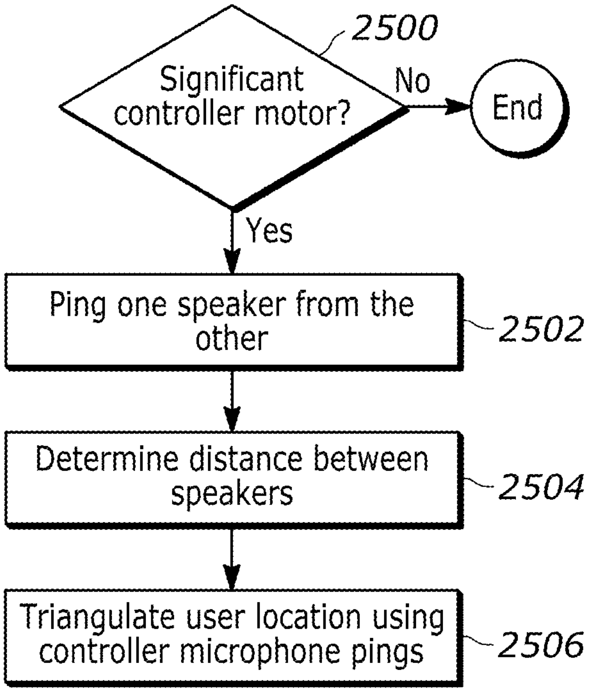
FIG. 25 illustrates example logic in example flow chart format for locating a user consistent with FIG. 24.

The first parameter that can be determined automatically is the distance between the speakers 2400, which can vary because the speakers are meant to be positioned flexibly, being battery powered. Refer to FIG. 25.

In one example, to save processing power the logic of FIG. 25 may be invoked only when significant controller motion is sensed at state 2500, e.g., by motion sensors in the speaker. In other embodiments the logic of FIG. 25 may occur without speaker movement, e.g., at certain times of day or at the elapse of a time period.

As indicated at state 2502, the on-speaker microphone 2404 can "ping" the other speaker with a test tone that is time-stamped. The test tone may be inaudible to the human ear, e.g., it may be ultrasonic. The other speaker can return an acoustic signal indicating when it received the test tone, and the difference in times between transmission and receipt can be converted to distance between the speakers at state 2504 to adjust parameters related to noise cancellation accordingly.

Figure 26:
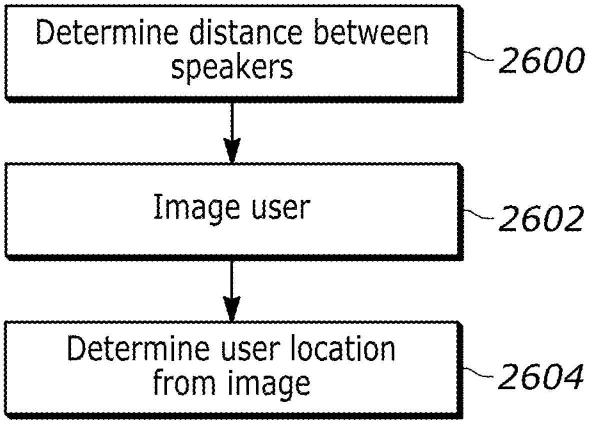
FIG. 26 illustrates alternative example logic in example flow chart format for locating a user consistent with FIG. 24.
Figure 27:
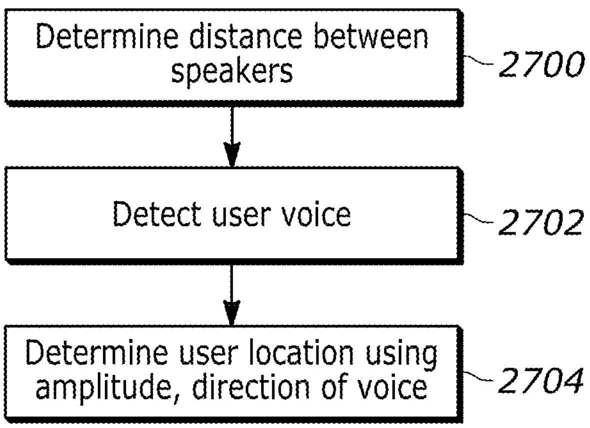
FIG. 27 illustrates a still further alternative example logic in example flow chart format for locating a user consistent with FIG. 24.

As indicated at state 2506 in FIG. 25, a second parameter that can be determined is the relative distance of the listener (location of the listener relative to the speakers). FIGS. 26 and 27 illustrate two example methods for doing so.

Commencing at state 2600 in FIG. 26, the distance between the speakers is determined as disclosed above. Moving to state 2602, the listener is imaged, e.g., by a camera 2410 on the speaker 2400 or other device. Moving to state 2604, the distance from the camera to the listener is determined using the image. In a non-limiting example, the size of the listener's face may be correlated to distance. Or, the image may be input to a ML model trained on face sizes and objects in images and ground truth distances to discern the distance based on the face size plus recognition of objects of typical size.

Alternatively, commencing at state 2700 in FIG. 27, the distance between the speakers is determined as disclosed above. Moving to state 2702, the listener's voice is captured by one of the microphones divulged herein. Moving to state 2704, the distance from the device supporting the microphone, e.g., the speaker 2400, is determined using the voice recording. In a non-limiting example, the volume of the listener's voice may be correlated to distance. Or, the voice recording may be input to a ML model trained on voice volumes and ground truth distances to discern the distance based on the voice volume.

Yet again, pinging of test tones between the microphones on the speakers and the microphone on the controller (used as a proxy for listener location) may be used consistent with principles herein to triangulate the locations of the speakers and listener.

Note that for purposes of FIG. 27, the player's natural speaking tone can be used for calibration in a setup step which may also account for room acoustic qualities.

Figure 28:
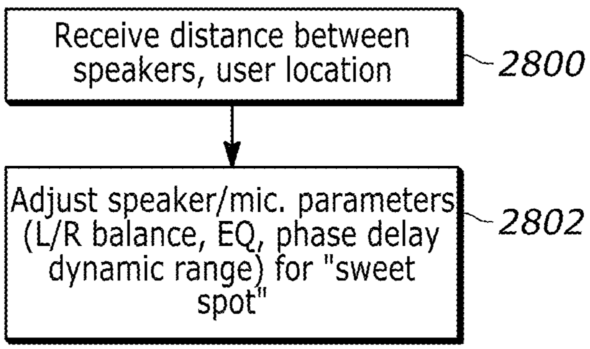
FIG. 28 illustrates example logic in example flow chart format for adjusting speaker settings consistent with any one of FIGS. 25-27.

FIG. 28 illustrates that once the relative locations and distances between the speakers and listener are known at state 2800, speaker and/or microphone parameters may be adjusted accordingly at state 2802. For example, based on the listener's distance from a speaker, the speaker microphone audibility of the speaker can be adjusted, e.g., far-field or near-field microphone. In addition, speaker parameters may be automatically adjusted to center the "sweet spot" on the location of the listener. These parameters may include one or more of right and left balance, EQ, dynamic range, speaker delays, volume.

An IMU in each speaker also may be used to determine speaker location. Additionally, feedback may be visually or audibly presented concerning where to move speakers to achieve better sound at a predetermined listener location, e.g., the couch.

Figure 29:
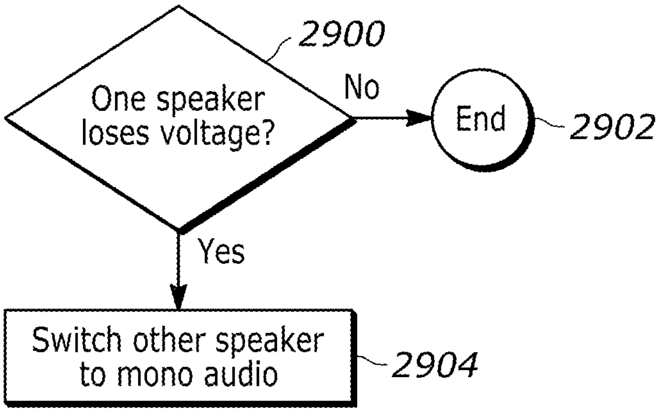
FIG. 29 illustrates example logic in example flow chart format for action upon loss of one of the speakers.
Figure 30:
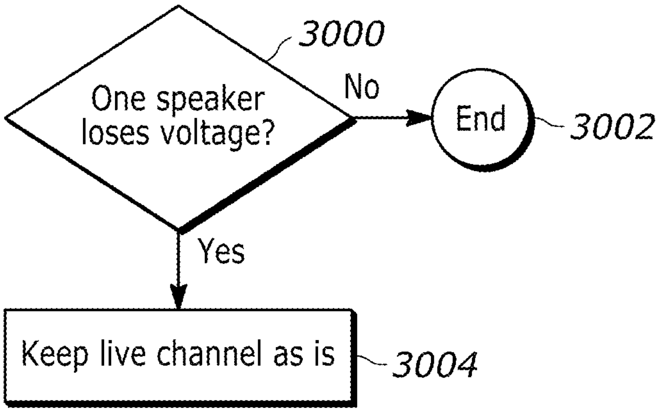
FIG. 30 illustrates alternative example logic in example flow chart format for action upon loss of one of the speakers.
Figure 31:
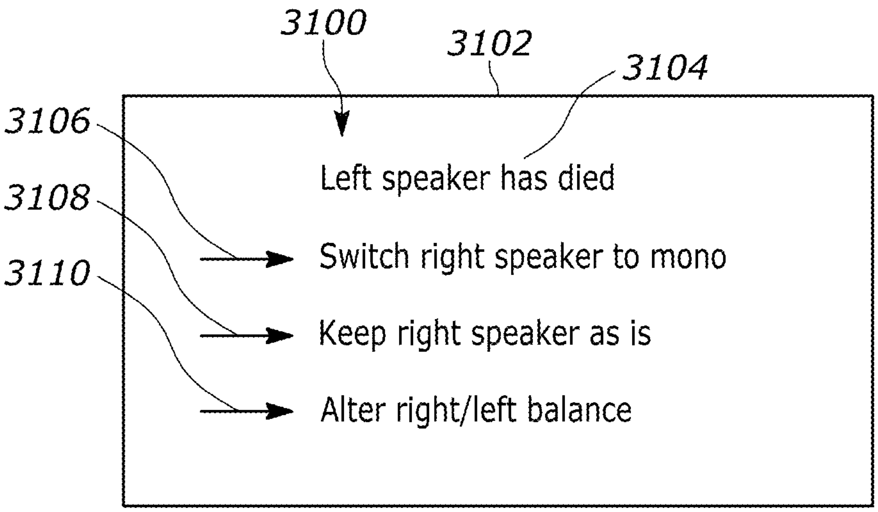
FIG. 31 is a screen shot of an example UI for input of user-determined action in the event of loss of a speaker.

FIGS. 29-31 illustrate techniques for dealing with loss of power or low voltage condition of one of the two stereo speakers. If it is not determined at state 2900 that one speaker is experiencing low voltage/dead battery as indicated by, e.g., a voltage sensor in the speaker or by the elapse of a lengthy time period since the speaker was last placed on the charging dock, the logic may end at state 2902. However, when a low voltage condition is returned at state 2900 the logic moves to state 2904 in which the other speaker that still retains acceptable voltage may be switched to mono mode in which all channels of audio are compressed into a single channel at a common volume per channel. Note that this logic may be applied not only to low power conditions but also to situations in which one speaker has been moved out of acoustic or wireless or visual range of the system.

FIG. 30, on the other hand, determines at state 3000 whether one speaker is experiencing low voltage/dead battery as indicated by, e.g., a voltage sensor in the speaker or by the elapse of a lengthy time period since the speaker was last placed on the charging dock, and if not, the logic may end at state 3002. However, when a low voltage condition is returned at state 3000 the logic moves to state 3004 in which the other speaker that still retains acceptable voltage is maintained as is in the stereo mode, thus playing either the right or left channel (whichever had been assigned to it). Note that this logic may be applied not only to low power conditions but also to situations in which one speaker has been moved out of acoustic or wireless or visual range of the system.

Recognizing that it would be advantageous to allow the player to choose whether or not to keep only the live channel, or to automatically switch to mono, FIG. 31 provides a UI 3100 that may be presented on a display 3102 such as any display herein. An advisory 3104 may be presented that a particular speaker has lost power. The UI 3100 may include one or more selectors to allow the user to select what action to take. In the non-limiting example shown, the selectors include a first selector 3106 selectable to switch the powered speaker to mono. The selectors also include a second selector 3108 selectable to maintain the powered speaker as is, e.g., playing the left or right channel of stereo sound. Still further, the selectors may include a third selector 3110 selectable to alter a right/left stereo channel balance, i.e., to increase the volume of one stereo channel and decrease the other. In other words, because a strong right/left balance is important, the player can select the right and left balance of the remaining audio so the player can still rely on positional cues.

Note that in alternate techniques, if low power but not yet loss of power is sensed on one speaker, a bass channel can be sent to the other speaker with more voltage to save power. Also, all EQ may be moved to the speaker with better voltage.

In example implementations a user can set his preferences (volume, EQ, etc.) and then when a speaker or entire the system is moved the speakers can alternate between two "states"—the "charge dock" orientation, and the "off charge dock" orientation.

Figure 32:
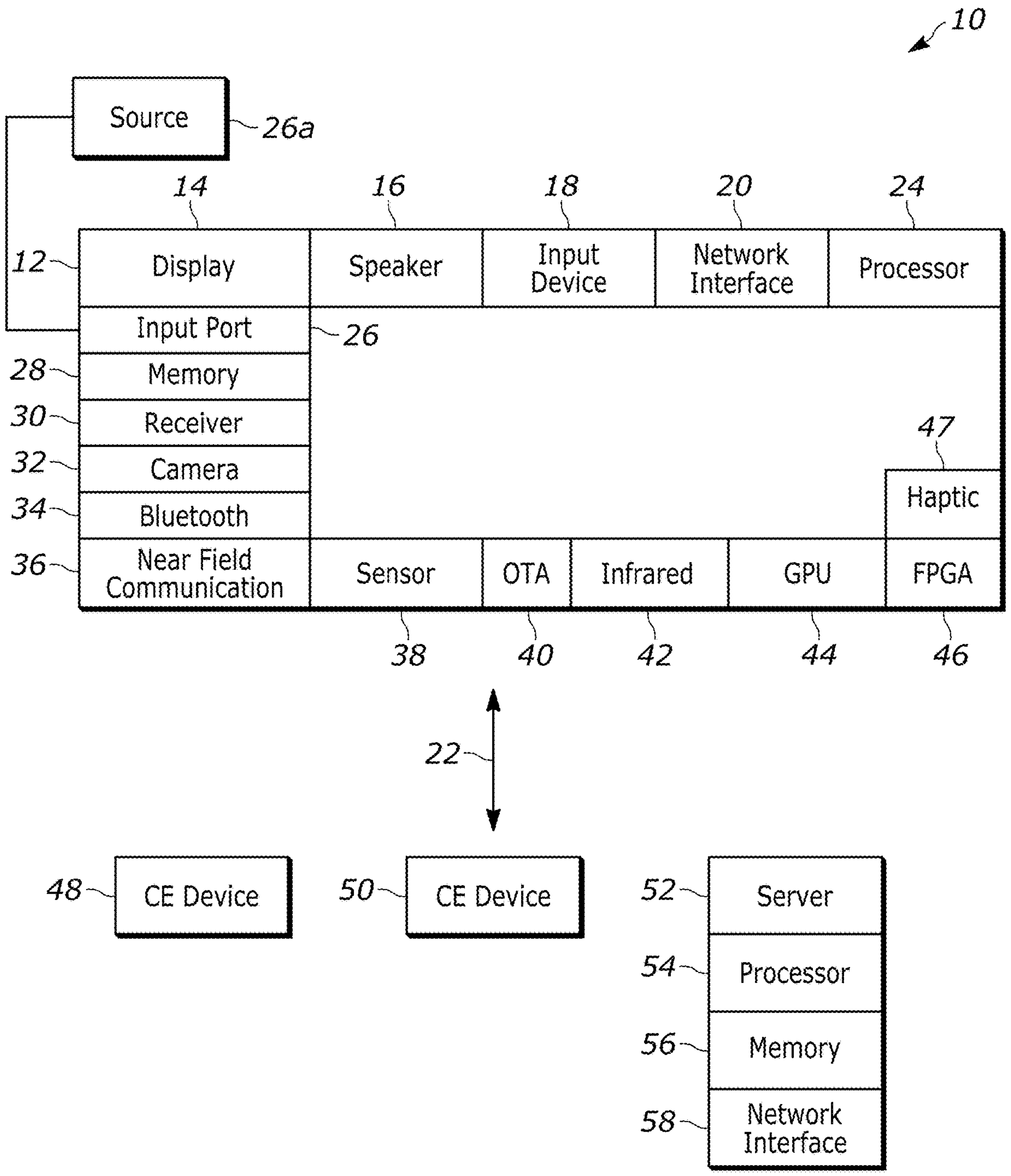
FIG. 32 is a block diagram illustrating various additional components that may be used in any of the preceding figures.

Referring now to FIG. 32, an example system 10 is shown, which may include one or more of the example devices mentioned herein in accordance with present principles and the components of which may be incorporated into any of the devices disclosed herein. The first of the example devices included in the system 10 is a consumer electronics (CE) device such as an audio video device (AVD) 12 such as but not limited to a theater display system which may be projector-based, or an Internet-enabled TV with a TV tuner (equivalently, set top box controlling a TV). The AVD 12 alternatively may also be a computerized Internet enabled ("smart") telephone, a tablet computer, a notebook computer, a head-mounted device (HMD) and/or headset such as smart glasses or a VR headset, another wearable computerized device, a computerized Internet-enabled music player, computerized Internet-enabled headphones, a computerized Internet-enabled implantable device such as an implantable skin device, etc. Regardless, it is to be understood that the AVD 12 is configured to undertake present principles (e.g., communicate with other CE devices to undertake present principles, execute the logic described herein, and perform any other functions and/or operations described herein).

Accordingly, to undertake such principles the AVD 12 can be established by some, or all of the components shown. For example, the AVD 12 can include one or more touch-enabled displays 14 that may be implemented by a high definition or ultra-high definition "4K" or higher flat screen. The touch-enabled display(s) 14 may include, for example, a capacitive or resistive touch sensing layer with a grid of electrodes for touch sensing consistent with present principles.

The AVD 12 may also include one or more speakers 16 for outputting audio in accordance with present principles, and at least one additional input device 18 such as an audio receiver/microphone for entering audible commands to the AVD 12 to control the AVD 12. The example AVD 12 may also include one or more network interfaces 20 for communication over at least one network 22 such as the Internet, an WAN, an LAN, etc. under control of one or more processors 24. Thus, the interface 20 may be, without limitation, a Wi-Fi transceiver, which is an example of a wireless computer network interface, such as but not limited to a mesh network transceiver. It is to be understood that the processor 24 controls the AVD 12 to undertake present principles, including the other elements of the AVD 12 described herein such as controlling the display 14 to present images thereon and receiving input therefrom. Furthermore, note the network interface 20 may be a wired or wireless modem or router, or other appropriate interface such as a wireless telephony transceiver, or Wi-Fi transceiver as mentioned above, etc.

In addition to the foregoing, the AVD 12 may also include one or more input and/or output ports 26 such as a high-definition multimedia interface (HDMI) port or a universal serial bus (USB) port to physically connect to another CE device and/or a headphone port to connect headphones to the AVD 12 for presentation of audio from the AVD 12 to a user through the headphones. For example, the input port 26 may be connected via wire or wirelessly to a cable or satellite source **26*a* of audio video content. Thus, the source 26*a* may be a separate or integrated set top box, or a satellite receiver. Or the source 26*a* may be a game console or disk player containing content. The source 26*a* when implemented as a game console may include some or all of the components described below in relation to the CE device 48**.

The AVD 12 may further include one or more computer memories/computer-readable storage media 28 such as disk-based or solid-state storage that are not transitory signals, in some cases embodied in the chassis of the AVD as standalone devices or as a personal video recording device (PVR) or video disk player either internal or external to the chassis of the AVD for playing back AV programs or as removable memory media or the below-described server. Also, in some embodiments, the AVD 12 can include a position or location receiver such as but not limited to a cellphone receiver, GPS receiver and/or altimeter 30 that is configured to receive geographic position information from a satellite or cellphone base station and provide the information to the processor 24 and/or determine an altitude at which the AVD 12 is disposed in conjunction with the processor 24.

Continuing the description of the AVD 12, in some embodiments the AVD 12 may include one or more cameras 32 that may be a thermal imaging camera, a digital camera such as a webcam, an IR sensor, an event-based sensor, and/or a camera integrated into the AVD 12 and controllable by the processor 24 to gather pictures/images and/or video in accordance with present principles. Also included on the AVD 12 may be a Bluetooth® transceiver 34 and other Near Field Communication (NFC) element 36 for communication with other devices using Bluetooth and/or NFC technology, respectively. An example NFC element can be a radio frequency identification (RFID) element.

Further still, the AVD 12 may include one or more auxiliary sensors 38 that provide input to the processor 24. For example, one or more of the auxiliary sensors 38 may include one or more pressure sensors forming a layer of the touch-enabled display 14 itself and may be, without limitation, piezoelectric pressure sensors, capacitive pressure sensors, piezoresistive strain gauges, optical pressure sensors, electromagnetic pressure sensors, etc. Other sensor examples include a pressure sensor, a motion sensor such as an accelerometer, gyroscope, cyclometer, or a magnetic sensor, an infrared (IR) sensor, an optical sensor, a speed and/or cadence sensor, an event-based sensor, a gesture sensor (e.g., for sensing gesture command). The sensor 38 thus may be implemented by one or more motion sensors, such as individual accelerometers, gyroscopes, and magnetometers and/or an inertial measurement unit (IMU) that typically includes a combination of accelerometers, gyroscopes, and magnetometers to determine the location and orientation of the AVD 12 in three dimension or by an event-based sensors such as event detection sensors (EDS). An EDS consistent with the present disclosure provides an output that indicates a change in light intensity sensed by at least one pixel of a light sensing array. For example, if the light sensed by a pixel is decreasing, the output of the EDS may be −1; if it is increasing, the output of the EDS may be a +1. No change in light intensity below a certain threshold may be indicated by an output binary signal of 0.

The AVD 12 may also include an over-the-air TV broadcast port 40 for receiving OTA TV broadcasts providing input to the processor 24. In addition to the foregoing, it is noted that the AVD 12 may also include an infrared (IR) transmitter and/or IR receiver and/or IR transceiver 42 such as an IR data association (IRDA) device. A battery (not shown) may be provided for powering the AVD 12, as may be a kinetic energy harvester that may turn kinetic energy into power to charge the battery and/or power the AVD 12. A graphics processing unit (GPU) 44 and field programmable gated array 46 also may be included. One or more haptics/vibration generators 47 may be provided for generating tactile signals that can be sensed by a person holding or in contact with the device. The haptics generators 47 may thus vibrate all or part of the AVD 12 using an electric motor connected to an off-center and/or off-balanced weight via the motor's rotatable shaft so that the shaft may rotate under control of the motor (which in turn may be controlled by a processor such as the processor 24) to create vibration of various frequencies and/or amplitudes as well as force simulations in various directions.

A light source such as a projector such as an infrared (IR) projector also may be included.

In addition to the AVD 12, the system 10 may include one or more other CE device types. In one example, a first CE device 48 may be a computer game console that can be used to send computer game audio and video to the AVD 12 via commands sent directly to the AVD 12 and/or through the below-described server while a second CE device 50 may include similar components as the first CE device 48. In the example shown, the second CE device 50 may be configured as a computer game controller manipulated by a player or a head-mounted display (HMD) worn by a player. The HMD may include a heads-up transparent or non-transparent display for respectively presenting AR/MR content or VR content (more generally, extended reality (XR) content). The HMD may be configured as a glasses-type display or as a bulkier VR-type display vended by computer game equipment manufacturers.

In the example shown, only two CE devices are shown, it being understood that fewer or greater devices may be used. A device herein may implement some or all of the components shown for the AVD 12. Any of the components shown in the figures may incorporate some or all of the components shown in the case of the AVD 12.

Now in reference to the afore-mentioned at least one server 52, it includes at least one server processor 54, at least one tangible computer readable storage medium 56 such as disk-based or solid-state storage, and at least one network interface 58 that, under control of the server processor 54, allows for communication with the other illustrated devices over the network 22, and indeed may facilitate communication between servers and client devices in accordance with present principles. Note that the network interface 58 may be, e.g., a wired or wireless modem or router, Wi-Fi transceiver, or other appropriate interface such as, e.g., a wireless telephony transceiver.

Accordingly, in some embodiments the server 52 may be an Internet server or an entire server "farm" and may include and perform "cloud" functions such that the devices of the system 10 may access a "cloud" environment via the server 52 in example embodiments for, e.g., network gaming applications. Or the server 52 may be implemented by one or more game consoles or other computers in the same room as the other devices shown or nearby.

The components shown in the figures may include some or all components shown in herein. Any user interfaces (UI) described herein may be consolidated and/or expanded, and UI elements may be mixed and matched between UIs.

Present principles may employ various machine learning models, including deep learning models. Machine learning models consistent with present principles may use various algorithms trained in ways that include supervised learning, unsupervised learning, semi-supervised learning, reinforcement learning, feature learning, self-learning, and other forms of learning. Examples of such algorithms, which can be implemented by computer circuitry, include one or more neural networks, such as a convolutional neural network (CNN), a recurrent neural network (RNN), and a type of RNN known as a long short-term memory (LSTM) network. Generative pre-trained transformers (GPTT) also may be used. Support vector machines (SVM) and Bayesian networks also may be considered to be examples of machine learning models. In addition to the types of networks set forth above, models herein may be implemented by classifiers.

As understood herein, performing machine learning may therefore involve accessing and then training a model on training data to enable the model to process further data to make inferences. An artificial neural network/artificial intelligence model trained through machine learning may thus include an input layer, an output layer, and multiple hidden layers in between that are configured and weighted to make inferences about an appropriate output.

While the particular embodiments are herein shown and described in detail, it is to be understood that the subject matter which is encompassed by the present invention is limited only by the claims.

What is claimed is:

1. An apparatus comprising:

at least a first speaker comprising:

at least first and second wireless radios configured to receive signals representing stereo audio from first and second sources;

circuitry configured to process first and second channels of each stereo audio from the first and second sources at least in part by:

mixing the first and second channels of each stereo audio from the first and second sources into a local channel and a remote channel;

splitting the local channel into a high band and a low band;

playing the high band on a tweeter of the first audio speaker;

playing the low band on a woofer of the first audio speaker; and using the local channel and remote channel to isolate signals from at least one microphone on the first speaker to produce isolated voice signals by executing stereo echo cancelation on the signals from the at least one microphone.

2. The apparatus of claim 1, wherein the circuitry is implemented in hardware.

3. The apparatus of claim 1, wherein the circuitry is implemented in software.

4. The apparatus of claim 1, wherein the circuitry is implemented in hardware and software.

5. The apparatus of claim 1, wherein the first wireless radio uses a first communication protocol and the second wireless radio uses a second communication protocol.

6. The apparatus of claim 1, wherein the circuitry is configured to:

implement user-adjusted EQ on the remote and local channels.

7. The apparatus of claim 6, wherein the circuitry is configured to:

implement non-user-adjusted EQ on the remote and local channels.

8. The apparatus of claim 1, wherein the circuitry is configured to:

implement user-adjusted EQ on the high band and the low band of the local channel.

9. The apparatus of claim 1, wherein the circuitry is configured to:

implement user-adjusted EQ on the isolated voice signals.

10. The apparatus of claim 1, wherein the circuitry is configured to:

send the isolated voice signals back through the first and second wireless radios to the first and second sources.

11. The apparatus of claim 10, comprising plural microphones on the first speaker, the circuitry being configured to:

implement beamforming on signals from the plural microphones before implementing stereo echo cancelation on signals from the microphones.

12. The apparatus of claim 1, wherein the circuitry is configured to:

implement noise cancelation on the isolated voice signals.

13. The apparatus of claim 1, wherein the first source comprises a computer game console and the second source comprises a wireless phone or tablet computer.

14. A computer-implemented method comprising:

receiving, at first and second wireless radios of a first speaker, signals representing stereo audio from first and second sources;

processing first and second channels of each stereo audio from the first and second sources, comprising:

mixing the first and second channels of each stereo audio from the first and second sources into a local channel and a remote channel;

splitting the local channel into a high band and a low band;

playing the high band on a tweeter of the first audio speaker; and playing the low band on a woofer of the first audio speaker; and using the local channel and remote channel to isolate signals from at least one microphone on the first speaker to produce isolated voice signals by executing stereo echo cancelation on the signals from the at least one microphone.

15. The method of claim 14, wherein the first wireless radio uses a first communication protocol and the second wireless radio uses a second communication protocol.

16. The method of claim 14, comprising:

implementing user-adjusted EQ on the remote and local channels.

17. The method of claim 16, comprising:

implementing non-user-adjusted EQ on the remote and local channels.

18. The method of claim 14, comprising:

implementing user-adjusted EQ on the high band and the low band of the local channel.

19. The method of claim 1, wherein the first source comprises a computer game console and the second source comprises a wireless phone or tablet computer.

20. A system comprising:

one or more processors, and one or more non-transitory computer-readable media that store instructions which, when executed by the one or more processors, cause the one or more processors to perform operations comprising:

receiving, at first and second wireless radios of a first speaker, signals representing stereo audio from first and second sources;

processing first and second channels of each stereo audio from the first and second sources, comprising:

mixing the first and second channels of each stereo audio from the first and second sources into a local channel and a remote channel;

splitting the local channel into a high band and a low band;

playing the high band on a tweeter of the first audio speaker; and playing the low band on a woofer of the first audio speaker; and using the local channel and remote channel to isolate signals from at least one microphone on the first speaker to produce isolated voice signals by executing stereo echo cancelation on the signals from the at least one microphone.

* * * * *